United States Patent
Kikani et al.

(10) Patent No.: US 11,346,086 B1
(45) Date of Patent: May 31, 2022

(54) MACHINE LEARNING FOR OPTIMIZING TOOL PATH PLANNING IN AUTONOMOUS EARTH MOVING VEHICLES

(71) Applicant: Built Robotics Inc., San Francisco, CA (US)

(72) Inventors: Gaurav Jitendra Kikani, San Francisco, CA (US); Noah Austen Ready-Campbell, San Francisco, CA (US); Andrew Xiao Liang, San Francisco, CA (US); Joonhyun Kim, San Francisco, CA (US)

(73) Assignee: Built Robotics Inc., San Francisco, CA (US)

( * ) Notice: Subject to any disclaimer, the term of this patent is extended or adjusted under 35 U.S.C. 154(b) by 0 days.

(21) Appl. No.: 17/359,421

(22) Filed: Jun. 25, 2021

(51) Int. Cl.
| | |
|---|---|
| *E02F 9/26* | (2006.01) |
| *G06N 20/00* | (2019.01) |
| *E02F 9/20* | (2006.01) |
| *G05D 1/02* | (2020.01) |
| *E02F 3/84* | (2006.01) |

(52) U.S. Cl.
CPC .............. *E02F 9/262* (2013.01); *E02F 3/841* (2013.01); *E02F 9/205* (2013.01); *E02F 9/2041* (2013.01); *E02F 9/2045* (2013.01); *E02F 9/265* (2013.01); *G05D 1/0274* (2013.01); *G06N 20/00* (2019.01); *G05D 2201/0202* (2013.01)

(58) Field of Classification Search
CPC ......... E02F 9/262; E02F 9/2041; E02F 9/205; E02F 9/265; E02F 9/2045; E02F 3/841; G06N 20/00; G05D 1/0274; G05D 2201/0202
See application file for complete search history.

(56) References Cited

U.S. PATENT DOCUMENTS

| | | | | |
|---|---|---|---|---|
| 6,954,999 | B1 * | 10/2005 | Richardson | E02F 5/02 37/348 |
| 2007/0240903 | A1 * | 10/2007 | Alft | E21B 7/046 175/50 |
| 2008/0097672 | A1 * | 4/2008 | Clark | E02F 9/2029 701/50 |
| 2008/0127530 | A1 * | 6/2008 | Kelly | E02F 3/847 37/403 |
| 2010/0245542 | A1 * | 9/2010 | Kim | G01B 11/00 348/46 |
| 2013/0006484 | A1 * | 1/2013 | Avitzur | G05D 1/0274 701/50 |

(Continued)

*Primary Examiner* — Russell Frejd
(74) *Attorney, Agent, or Firm* — Fenwick & West LLP

(57) ABSTRACT

An autonomous earth moving system can select an action for an earth moving vehicle (EMV) to autonomously perform using a tool (such as an excavator bucket). The system then generates a set of candidate tool paths, each illustrating a potential path for the tool to trace as the earth moving vehicle performs the action. In some cases, the system uses an online learning model iteratively trained to determine which candidate tool path best satisfies one or more metrics measuring the success of the action. The earth moving vehicle the executes the earth moving action using the selected tool path and measures the results of the action. In some implementations, the autonomous earth moving system updates the machine learning model based on the result of the executed action.

20 Claims, 16 Drawing Sheets

(56) References Cited

U.S. PATENT DOCUMENTS

| | | | |
|---|---|---|---|
| 2013/0160543 A1* | 6/2013 | Kontz | G01C 19/5776 |
| | | | 73/504.12 |
| 2014/0277966 A1* | 9/2014 | Kelly | E02F 9/2029 |
| | | | 701/50 |
| 2015/0078837 A1* | 3/2015 | Kruse | E02D 27/28 |
| | | | 405/232 |
| 2015/0199106 A1* | 7/2015 | Johnson | G06F 3/011 |
| | | | 715/740 |
| 2016/0258129 A1* | 9/2016 | Wei | E02F 9/2029 |
| 2019/0071841 A1* | 3/2019 | Elkins | E02F 3/844 |
| 2021/0004744 A1* | 1/2021 | Petrany | G06Q 10/06313 |
| 2021/0105995 A1* | 4/2021 | Palomares | G05D 1/0246 |
| 2021/0124359 A1* | 4/2021 | Wei | E02F 9/262 |
| 2021/0157312 A1* | 5/2021 | Cella | G05B 19/41875 |

* cited by examiner

MACHINE LEARNING FOR OPTIMIZING TOOL PATH PLANNING IN AUTONOMOUS EARTH MOVING VEHICLES

BACKGROUND

Field of Art

The following disclosure relates generally to a method for moving material to, from, or within a work site using autonomous heavy machines.

Description of the Related Art

Heavy machines and/or construction vehicles, for example backhoes, loaders, and excavators, (generally referred to herein as "earth moving vehicles") are often used to move and manipulate large quantities of earth or other similar material. Currently, operation of earth moving vehicles is very expensive as each vehicle requires a manual operator be available and present during the entire process to control the earth moving vehicle. Further, implementing autonomous control of an earth moving vehicle presents other challenges because of changeable conditions on many work sites and the complexity and variety of earth moving vehicle models.

Many work sites are outdoors, where soil conditions can dramatically change day to day and hour to hour due to the weather, through excavation to lower layers of material, or the like. The properties of soil being moved or excavated can alter the optimal strategy for an earth moving vehicle interacting with the soil. Similarly, many earth moving vehicles need to coordinate multiple control surfaces to perform even simple-sounding tasks. For example, excavators generally have multi-element arms with multiple joints that are coordinated to use the excavator bucket. Further, the same action may be able to be performed in a variety of ways depending on the current conditions.

Additionally, there is a large variety of specialized earth moving vehicle models, each with different control surface layouts, actuation strengths, and other characteristics which make it difficult to develop an autonomous control system that can effectively control multiple types of earth moving vehicle. Similarly, many earth moving vehicles use a mixture of actuation and control methods (such as, hydraulic, electronic actuation, pneumatic, and the like) which each may react differently to control input.

SUMMARY

Described herein is an autonomous or semi-autonomous earth moving system including a control system, sensors, and an earth moving vehicle (EMV) for excavating or performing other tasks on a work site. The earth moving system controls and navigates the earth moving vehicle within a work site to autonomously perform earth moving routines or other actions. The earth moving system uses a combination of sensors integrated into the earth moving vehicle to record the positions and orientations of the various components of the earth moving vehicle and/or the conditions of the surrounding environment. Data recorded by the sensors may be aggregated or processed in various ways, for example, to generate digital representations of a work site and instructions for excavating earth from the work site, determine and control the movement of the earth moving vehicle over routes within the work site, and perform other tasks described herein.

An autonomous earth moving system can select an action for an earth moving vehicle to autonomously perform using a tool (such as an excavator bucket). The system then generates a set of candidate tool paths, each illustrating a potential path for the tool to trace as the earth moving vehicle performs the action. In some cases, the system uses an online learning model iteratively trained to determine which candidate tool path best satisfies one or more metrics measuring the success of the action. The earth moving vehicle then executes the earth moving action using the selected tool path and measures the results of the action. In some implementations, the autonomous earth moving system updates the machine learning model based on the result of the executed action.

Similarly, the autonomous earth moving system can determine a desired state for a portion of the EMV including at least one control surface. Then the EMV selects a set of control signals for moving the portion of the EMV from the current state to the desired state using a machine learning model trained to generate control signals for moving the portion of the EMV to the desired state based on the current state. After the EMV executes the selected set of control signals, the system measures an updated state of the portion of the EMV. In some cases, this updated state of the EMV is used to iteratively update the machine learning model using an online learning process.

When an EMV performs an action comprising moving a tool of the EMV through soil or other material, the EMV can measure a current speed of the tool through the material and a current kinematic pressure exerted on the tool by the material. Using the measured current speed and kinematic pressure, the EMV system can use a machine learned model to determine one or more soil parameters of the material. The EMV can then make decisions based on the soil parameters, such as by selecting a tool speed for the EMV based on the determined soil parameters.

In some implementations, the EMV uses a calibration to inform autonomous control over the EMV. To calibrate an EMV, the system first selects a calibration action comprising a control signal for actuating a control surface of the EMV. Then, using a calibration model comprising a machine learning model trained based on one or more previous calibration actions taken by the EMV, the system predicts a response of the control surface to the control signal of the calibration action. After the EMV executes the control signal to perform the calibration action, the EMV system monitors the actual response of the control signal and uses that to update the calibration model based on a comparison between the predicted and monitored states of the control surface.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Autonomous Earth Moving System

An earth moving system, as used herein, is a system including one or more earth moving vehicles (EMVs) capable of autonomously or semi-autonomously manipulating earth, debris, or other material at a work site. Herein, the term "material" refers to earth (dirt, soil, gravel, construction aggregate, and the like) and/or other materials (for example, boards, concrete, other construction supplies, waste, or debris) which an EMV (or other aspect of an earth moving system) may interact with using a tool of the EMV. Though some implementations are described herein in relation to earth or soil, this description is not intended to exclude implementations involving the manipulation of other materials, such as construction aggregate and/or building supplies. For example, the terms "earth moving" and "moving earth" may apply both to the movement of dirt, soil, or gravel as well as to the movement of non-earth materials, such as boards or concrete. For simplicity, the terms "earth moving," "moving earth," "earth moving action," and the like as used throughout the following description are not intended to be limiting to any one context or type of material.

Figure 1:
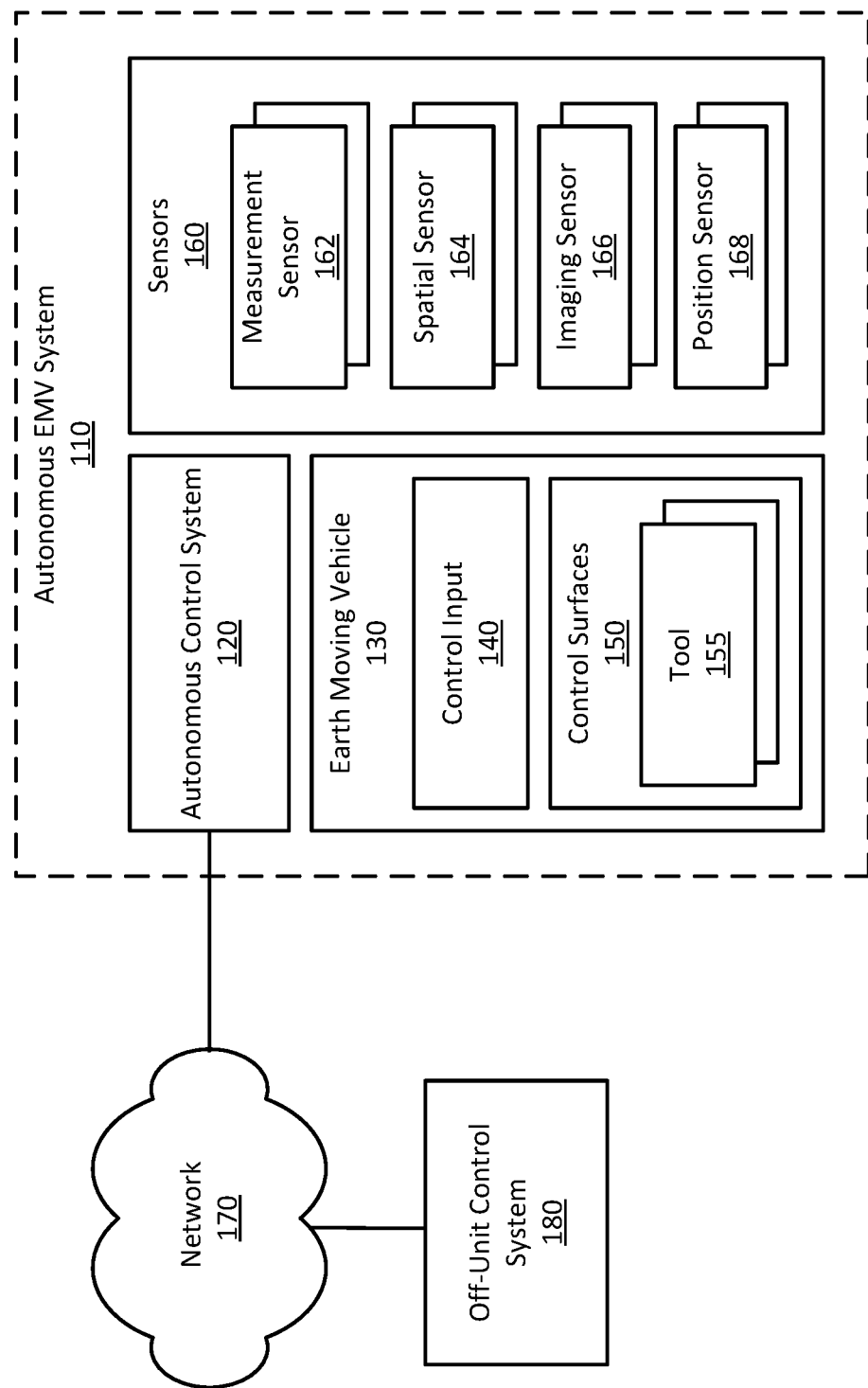
FIG. 1 is an environment diagram showing an autonomous earth moving system, according to one embodiment.
Figure 2A:
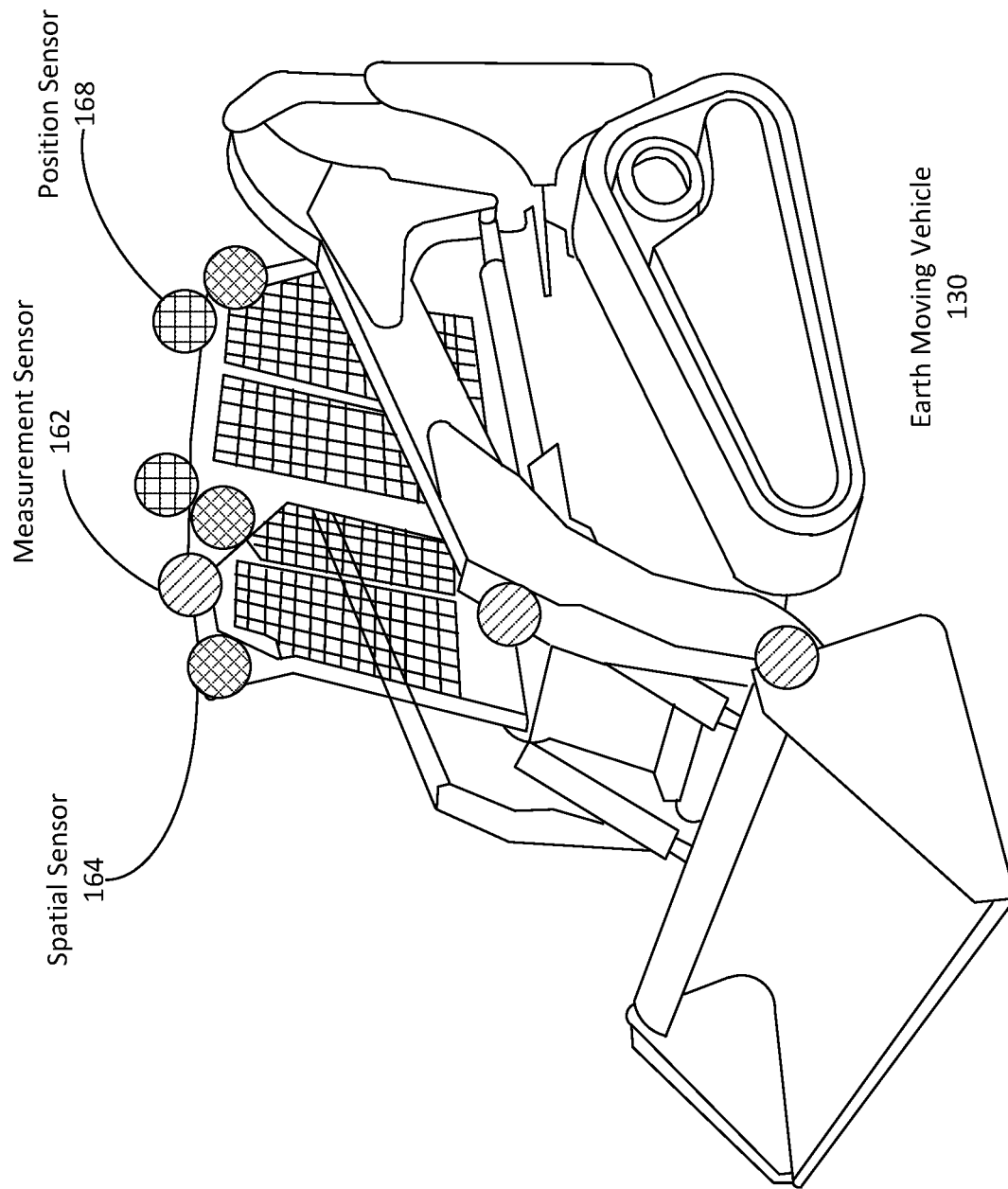
FIG. 2A illustrates an example placement of sensors for a compact track loader, according to one embodiment.
Figure 2B:
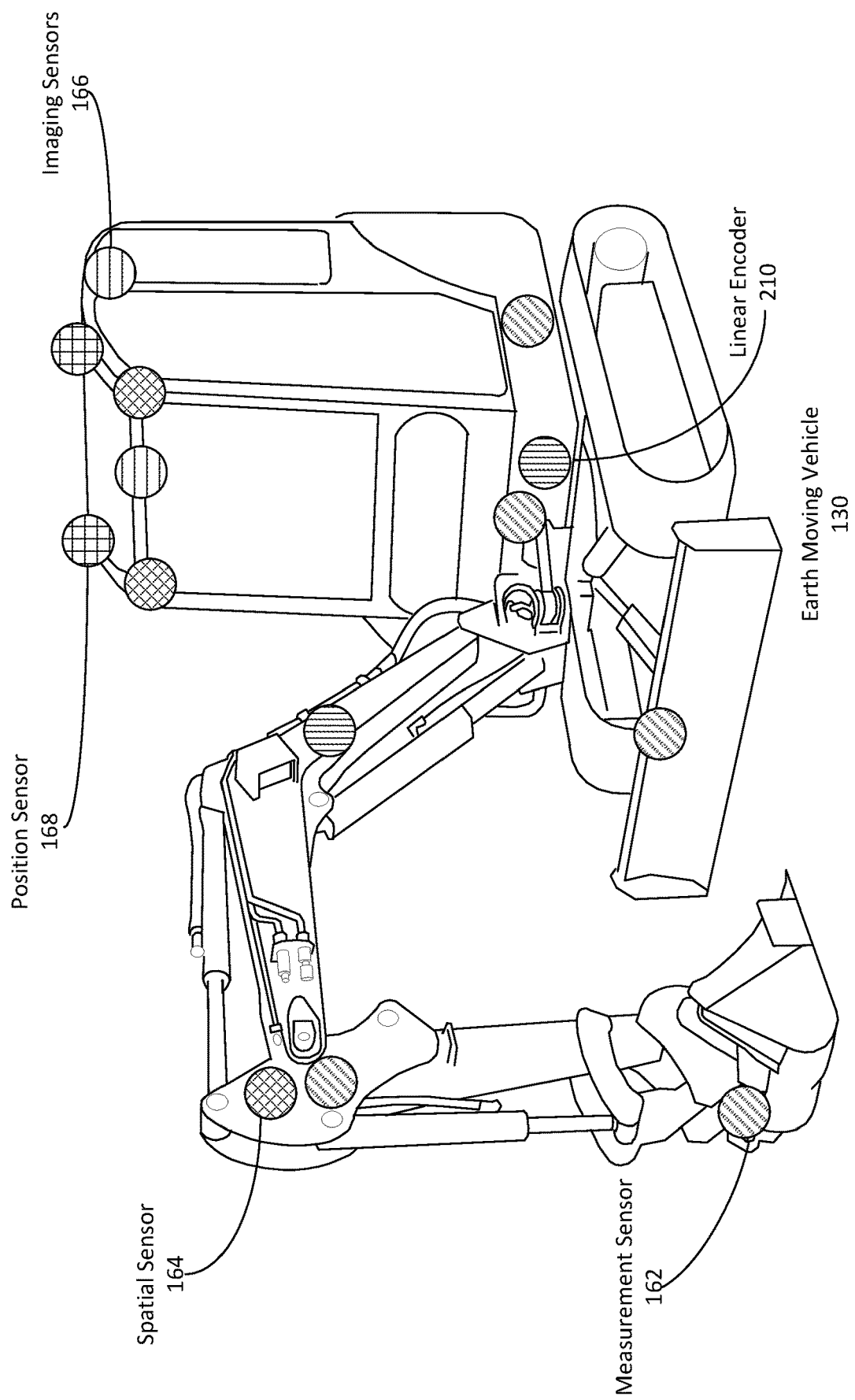
FIG. 2B illustrates an example placement of sensors for an excavator, according to one embodiment.

FIG. 1 is an environment diagram showing an autonomous earth moving system, according to one embodiment. The environment 100 of FIG. 1 includes an autonomous EMV system 110, a network 170, and an off-unit control system 180 which can communicate with the autonomous EMV system 110. The autonomous EMV system 110 includes an autonomous control system 120 which can interface with an earth moving vehicle (EMV) 130 and a suite of sensors 160. The sensors 160 can include sensors mounted on and/or around the EMV 130 (or otherwise providing information on the work site). In some implementations, the sensors 160 include sensors mounted on the EMV 130 to record data describing the state of the EMV and the work site. For example, the sensors 160 of environment 100 includes measurement sensors 162, spatial sensors 164, imaging sensors 166, and position sensors 168 for monitoring the state of the EMV 130. As examples, FIGS. 2A and 2B (which will be discussed further below) illustrate the example placement of sensors for, respectively, a compact track loader and an excavator.

Figure 3:
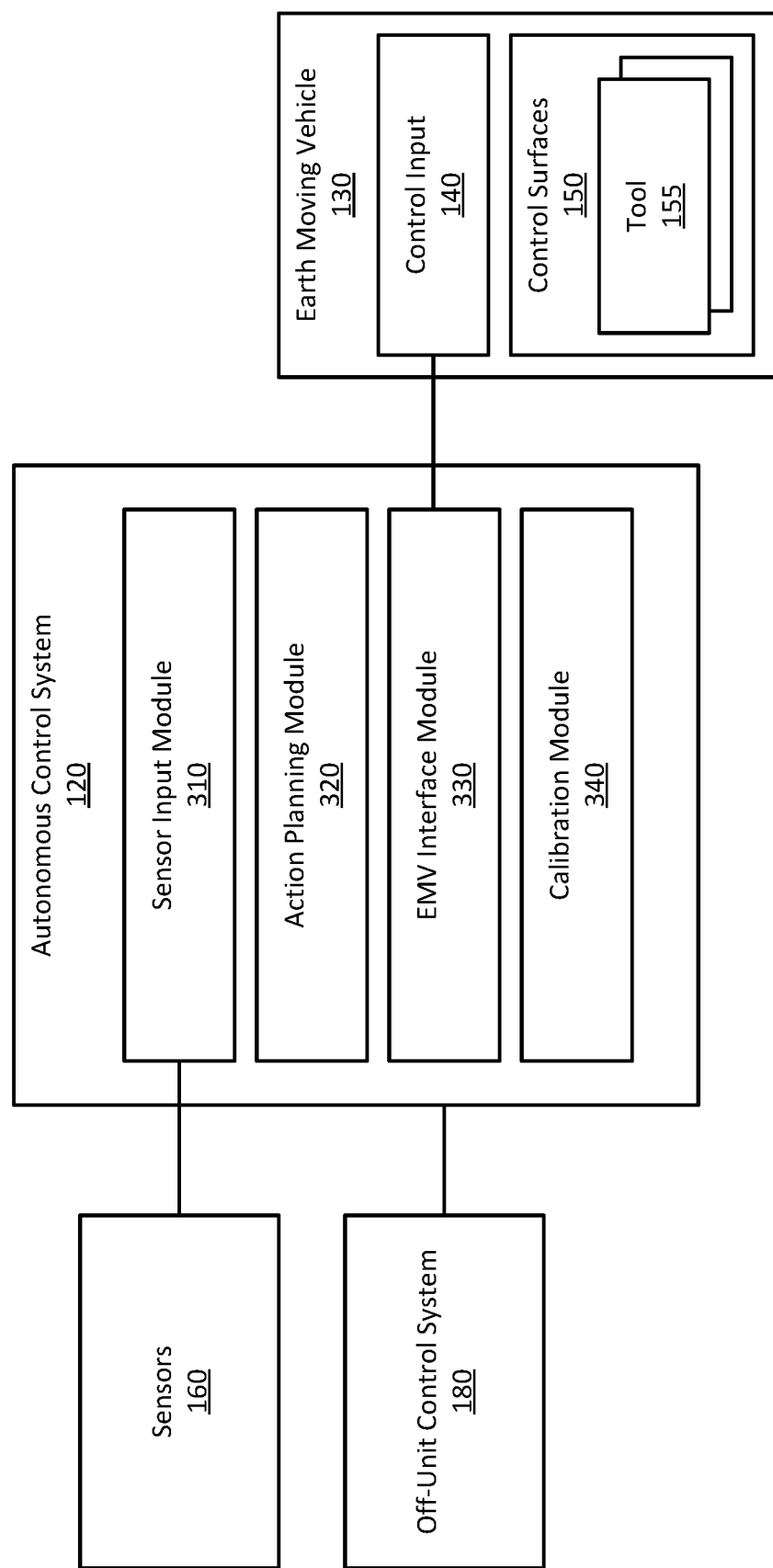
FIG. 3 is a block diagram of an autonomous control system of an earth moving vehicle, according to one embodiment.

Each of these components will be discussed further below in relation to FIGS. 1-3. Although FIG. 1 illustrates only a single instance of most of the components of the autonomous EMV system 110, in practice more than one of each component may be present, and the EMV system 110 or environment 100 may include additional, fewer, or different components than those described herein.

Earth Moving Vehicle

As used herein, an earth moving vehicle (EMV) such as the EMV 130 is a vehicle designed to manipulate construction material on a work site. EMVs are typically large and capable of moving and/or manipulating large volumes of construction material at a single time, particularly relative to what an individual human can move by hand.

As used herein, "earth moving" refers generally to moving or shaping earth or other material within a work site, for example digging or filling a hole, leveling a mound, excavating, or depositing a volume of earth or materials from a first location to a second location. In some implementations, earth moving vehicles 130 excavate earth by scraping or digging earth from beneath the ground surface. Examples of earth moving vehicles 130 within the scope of this description include, but are not limited to, loaders such as backhoe loaders, track loaders, wheel loaders, skid steer loaders, scrapers, graders, bulldozers, compactors, excavators, mini-excavators, trenchers, skip loaders, and other types of construction machines.

Among other components, earth moving vehicles 130 generally include a chassis or frame upon on which all other components are physically mounted, a drive system which gives the EMV 130 mobility through the work site, and one or more engines or other power sources. Additionally, an EMV 130 may include a control input 140 allowing control over the operation of the EMV 13, a set of control surfaces 150 (including an EMV tool 155) controlled by the control input 140, and one or more sensors 160 mounted on or around the EMV 130.

Each control surface 150 represents one or more parts or portions of the EMV 130 that can be moved or otherwise controlled based on control signals received by the control input 130 of the EMV 130. A control surface 150 can be manipulated through the control input 140 to maneuver the EMV 130, perform an earth moving action, or otherwise change the state of the EMV 130. The number and function of each control surfaces 150 depend on the type and purpose of the EMV 130. For example, a skid-steer vehicle may include separate control surfaces 150 for the left and right tracks of the EMV, whereas a wheeled EMV may include throttle and steering control surfaces. Example control surfaces 150 include but are not limited to: throttles and propulsion controls, brakes, articulated joints (such as hydraulically actuated joints), and electronic devices (such as lights or sensors 160).

Similarly, the EMV 130 may include control surfaces 150 associated with a tool 155 used to manipulate material and/or perform earth moving actions. In some implementations, different aspects of the tool 155 are controlled by different control surfaces 150, including not only control surfaces for the instrument for manipulating material (such as excavator bucket for collecting dirt), but also one or more articulated elements for positioning and operating the instrument. For example, in an excavator or loader, the tool 155 can be associated with control surfaces 150 for the bucket itself (for example, controlling the relative angle of the bucket or a "thumb" of the bucket) in addition to separate control surfaces 150 for the joints of the multi-element arm that adjusts the position and orientation of the bucket.

In some embodiments, the EMV 130 accepts instructions for controlling one or more control surfaces 150 through the control input 140. The control input 140 may be configured for manual control by a human operator or can be linked to the autonomous control system 120 for autonomous control. The control input 140 of an EMV can include multiple controls corresponding to different control surfaces 150 using a variety of methods to receive control signals. For example, control signals can be received electronically (as in controls for electronics such as lights or in "drive-by-wire" systems) or via mechanical input (such as through motion of a mechanical linkage or by applying force to a hydraulic system). A control input 140 can include a set of joysticks/levers controlling the EMV's drive system, tool 155, and any other directly controllable control surface 150.

In some implementations, the engine powers both the drive system and the operation of the control surfaces 150. The engine may be an internal combustion engine, or an alternative power plant, such as an electric motor or battery. In many earth moving vehicles 130, the engine powers the drive system and a hydraulic system used to actuate the tool 155. A common property of hydraulic systems used within earth moving vehicles 130 is that the hydraulic capacity of the earth moving vehicle 130 is shared between the drive system and other control surfaces 150. In some embodiments, the instructions and control logic for the earth moving vehicle 130 to operate autonomously and semi-autonomously includes instructions relating to determinations about how and under what circumstances to allocate the hydraulic capacity of the hydraulic system.

Sensor System

As introduced above, the set of sensors 160 includes a combination of measurement sensors 162, spatial sensors 164, imaging sensors 166, position sensors 168, and/or other types of sensors. In some implementations, sensors 160 are configured to collect data related to an earth moving vehicle 130, environmental data surrounding the earth moving vehicle 130, or environmental data about the work site. In some implementations, sensors 160 are either removably mounted to the EMV 130 or integrated into the EMV (either as a modification or as factory equipment from the manufacturer of the EMV 130).

Sensors 160 can transmit collected data, in real-time or as soon as a network connection is achieved, automatically without input from the earth moving vehicle 130 or a human operator. Sensor 160 may be configured to communicate received data to the autonomous control system 120 and/or the off-unit control system 180. In some implementations, sensor data is transmitted to both control system 120 and 180, such that recorded data arrives at the off-unit control system 180 for consumption and decision making by a manual operator while also providing the data to the autonomous control system 120 for autonomous or semi-autonomous decision making and control of the EMV 130.

Data collected by sensors 160 can be used by the autonomous control system 120 and/or the off-unit control system 180 to inform the operation of the EMV 130 (for example, for determining and performing one or more earth moving routines and/or actions). For example, the autonomous control system 120 can control the drive system of the EMV 130 to reposition the EMV based on environmental data and/or a location of the earth moving vehicle 130 gathered by a sensor 160.

An individual sensor 160 or group of sensors 160 may include its own network adapter (not shown) that communicates with the control systems 120 and 180 through either a wired or wireless connection to send sensor data, change modes, or the like. For wireless connections, the network adapter may be a Bluetooth Low Energy (BTLE) wireless transmitter, infrared, or 802.11 based connection. For example, if the network adapter of the sensor assembly 110 is configured to communicate via a wireless standard such as 802.11 or LTE, the network adapter may exchange data with a wireless access point such as a wireless router, which may in turn communicate with the control system 120 and 180. For wired connection, a wide variety of communications standards and related architecture may be used, including Ethernet, a Controller Area Network (CAN) bus, or similar.

Depending on the implementation, individual sensors 160 and the sensor suite as a whole range in complexity from simplistic measurement devices that output analog signals electrically coupled to a network bus or other communicative network to more complicated devices which include their own onboard computer processors, memory, and communications adapters to gather, process, and transmit sensor data. Regardless of construction, the sensors 160 together function to record, store, and report information to the autonomous control system 120 and/or off-unit control system. In some implementations, a timestamp is associated with recorded sensor data, either by the recording sensor 160 at the time of collections, or by the autonomous control system 120/off-unit control system 180 as the sensor data is received.

Measurement sensors 162 generally measure properties of the ambient environment, or properties of the earth moving vehicle 130 itself. These properties may include tool and control surface position/orientation and/or relative articulation, vehicle speed, ambient temperature, hydraulic pressure, and the like. A variety of possible measurement sensors 168 may be used, including hydraulic pressure sensors, linear encoders, radial encoders, inertial measurement unit sensors, incline sensors, accelerometers, strain gauges, gyroscopes, and string encoders.

Spatial sensors 164 may collect information about the relative position of object in the environment around the EMV 130. For example, a spatial sensor 164 may output a three-dimensional map in the form of a three-dimensional point cloud representing distances between one meter and fifty meters between the spatial sensors 164 and the ground surface or any objects within the field of view of each spatial sensor 164. In one embodiment, spatial sensors 164 include a set of light emitters (e.g., Infrared (IR)) configured to project structured light into a field near the earth moving vehicle 130, a set of detectors (e.g., IR cameras), and a processor configured to transform data received by the infrared detectors into a point cloud representation of the three-dimensional volume captured by the infrared detectors as measured by structured light reflected by the environment. In one embodiment, the spatial sensor 164 is a LIDAR sensor having a scan cycle that sweeps through an angular range capturing some or all of the volume of space surrounding the earth moving vehicle 164. Other types of spatial sensors 164 may also be used, including time-of-flight sensors, ultrasonic sensors, and radar sensors.

Imaging sensors 166 capture still or moving-video representations of the ground surface, objects, and environment surrounding the earth moving vehicle 130. Examples of imaging sensors 166 include, but are not limited to, stereo RGB cameras, structure from motion cameras, and monocular RGB cameras. In one embodiment, each image sensor 166 can output a video feed containing a sequence of digital photographic images at a rate of 20 Hz. In one embodiment, multiple imaging sensors 166 are mounted such that each imaging sensor 166 captures some portion of the entire 360-degree angular range around the vehicle. For example, front, rear, left lateral, and right lateral imaging sensors 166 may be mounted to capture the entire angular range around the earth moving vehicle 130.

Position sensors 168 provide a position of the earth moving vehicle 130. This may be a localized position within a work site, or a global position with respect latitude/longitude, or some other external reference system. In one embodiment, a position sensor is a global positioning system interfacing with a static local ground-based GPS node mounted to the earth moving vehicle 130 to output a position of the earth moving vehicle 130.

There are numerous different ways for the sensor assembly 160 generally and the individual sensors specifically to be constructed and/or mounted to the earth moving vehicle 130. This will also depend in part on the construction and type of the earth moving vehicle 130. Using the compact track loader of FIG. 2A as an example, the representations with diagonal crosshatching represent the example placements of a set of measurement sensors 162, the representation with diamond crosshatching represent example placements of a set of spatial sensors 164, and the representations with grid crosshatching represent example placements of a set of position sensors 168. Using the excavator shown in FIG. 2B as another example, diagonal crosshatchings represent measurement sensors 162 (for example, the vertical crosshatchings near the drive system 210 represent example placements for a linear encoder 210 measuring the relative rotation of the tracks and chassis), diamond crosshatchings represent spatial sensors 164, grid crosshatchings represent position sensors 168, and horizontal crosshatchings near the roof represent imaging sensors 166 (for example RGB cameras).

Autonomous Control System

An autonomous control system 120 can include computer hardware (for example, microcontrollers, computers, and/or computing devices) capable of interpreting sensor data and/or commands from an off-unit controller 180 and interfacing with the EMV 130 to perform actions. As described above, data collected by sensors 160 is communicated to the autonomous control system 120 to assist in the control of the EMV 130. In some implementations, an autonomous control system 120 includes interface hardware allowing the ACS 120 to send various types of control signals to the control input 140 of the EMV 103. Interfaces between the autonomous control system 120 and the EMV 130 can be electronic (to send analog and/or digital control signals), mechanical (using servo motors or the like to physically manipulate one or more controls), or any other suitable interface method.

In some embodiments, the autonomous control system 120 is implemented as a modification or retrofit to the EMV 130 giving the EMV 130 the capability for autonomous or semi-autonomous control. In other implementations, the EMV 130 is designed and/or manufactured with an integrated autonomous control system 120. In some implementations, the addition of the ACS 120 includes the replacement of some aspects of the control input 140 or the addition of new controls to the control input 140 for interfacing with the autonomous control system 120.

In some implementations, the autonomous control system 120 controls the EMV 130 through the selection and execution of one or more earth moving routines. An "earth moving routine," as used herein, is a set of computer instructions that coordinates control of the various control surfaces 150 of the earth moving vehicle 130 to accomplish a task on the work site. For example, earth moving routines can accomplish work site preparation, digging or excavation objectives (including digging, dumping, grading, filling, trenching, compacting, backfill, wall cutback etc.), fill estimation and volume checks for a tool of the EMV 130, and/or EMV calibration objectives.

In some implementations, earth moving routines are subdivided into "earth moving actions" representing individual actions that are performed (sometimes repetitively) by an EMV 130 during the earth moving routine. For example, an earth moving routine for excavating a specific area (such as trenching from point A to point B) can be associated with earth moving actions for scooping dirt from a target location, maneuvering to an appropriate dump location, and dumping the excavated dirt, among others. In some implementations, the autonomous control system 120 dynamically selects earth moving actions (and parameters for those earth moving actions) to accomplish a target earth moving routine based on the current state of the work site and EMV 130. For example, earth moving actions can include scooping or dumping material with a tool 155, performing a maneuver (such as a turning the EMV 130), or performing tool-specific actions (such as jerking an excavator bucket to level the material in the bucket).

The autonomous control system 120 can be designed to control an EMV 130 to carry out an earth moving routine either entirely autonomously or semi-autonomously. In some implementations, a semi-autonomously operating EMV 130 not only responds to instructions from the autonomous control system 120, but also responds to commands from a manual operator. For example, a manual operator may be able to specify an earth moving routine for the EMV 130 to complete. Manual operators of the earth moving vehicle 130 may monitor the earth moving routine from inside of the earth moving vehicle 130 using the autonomous control system 120 or remotely using an off-unit control system 180 located at the work site or off-site in a remote location. Manual operation may take the form of manual input to control input 140 or specific manual operation only controls, such as an emergency stop. Sensor data is received by the autonomous control system 120 and assists in the carrying out of those instructions, for example by modifying exactly what inputs are provided to the EMV 130 in order to achieve the instructions to be accomplished as part of the earth moving routine.

In some implementations, the autonomous control system 120 trains and maintains a set of machine learning models that help the autonomous control system 120 to select actions and control signals for execution by the EMV 130. A machine learning model is an algorithm that is automatically generated based on a set of training data (generally using iterative methods) to predict one or more output values based on a set of input features. A training data set can contain many input features and, in some implementations, the corresponding output values. Depending on the embodiment, the autonomous control system can use many different machine learning techniques, including supervised learning (using training data labeled to include correct output values), unsupervised learning (using unlabeled training data), reinforcement learning, deep learning or neural network algorithms, active learning, online learning, incremental learning, and other suitable techniques or algorithms. The autonomous control system 120 can use machine learning models to, for example, process sensor data (for example, to determine soil parameters for material the EMV 130 is interacting with), optimize future actions of the EMV 130 (by selecting an optimal tool path to perform an action), or to predict the response of an EMV 130 to a control signal (through a generated calibration or control model).

In some implementations, the autonomous control system 120 uses online learning techniques to train and update machine learning models. An online learning model (i.e. a machine learning model trained using online learning techniques) is continuously updated and refined as the model is in use, using newly acquired training data as it received. An online learning model can be initially trained or instantiated using baseline training data (or using an assumed model) that is then iteratively refined each time a new data point is received or measured. For example, an online learning model predicting EMV 130 response to a control signal can be updated each time the EMV 130 executes a control signal (and the EMV response is measured using sensors 160). In some implementations, online learning implementations update models incrementally based only on the newest training data points (or small batches of recent data points). In contrast, many other machine learning implementations update models by fully retraining based on all available data (including the most recent training data). Using online learning can allow an autonomous control system 120 to adapt its machine learning models to the current situation and environment of the EMV 130 during operation of the EMV 130. Using online learning techniques can eliminate downtime and work interruptions resulting from taking systems offline to retrain (as may be necessary in non-online learning implementations). For example, the autonomous control system 120 can use online machine learning to adapt a model for predicting soil parameters to the current soil or material on the work site as the EMV 130 is in operation. The use of online learning can also lead to quicker adaptation to current conditions (relative to other machine learning methods) and more of a focus on the current conditions on the work site (as opposed to reliance on potentially stale static training data). In some implementations, online learning implementations have additional performance benefits such as less memory usage and reduced computational complexity when compared to implementations not using online learning.

The autonomous control system 120 may also exchange information with the off-unit control system 180 and/or other earth moving vehicles 130 (not shown) via the network 170. For example, an earth moving vehicle 130 may communicate recorded sensor data to a fleet of additional earth moving vehicles 130 on the work site. Similarly, through the network 170, the control systems 120 and 180 may deliver data regarding a specific work site to a central location from which the fleet of earth moving vehicles 130 are stored.

The autonomous control system 120 may also process data received from sensors 160. Processing can take sensor data in a "raw" format not directly usable by the autonomous control system 120 and converts it into a form that is useful for analysis or decision making. For example, the autonomous control system 120 may synthesize data from the various sensors into a real-time scan of the ground surface of the work site around the earth moving vehicle 130. For example, the autonomous control system 120 can generate a digital environment map by fusing the point clouds from various spatial sensors 130, stitching images from multiple imaging sensors 135, and registering the images and point clouds relative to each other or an external reference frame as provided by position sensors 145 or other data sources. Processing may also include up sampling, down sampling, interpolation, filtering, smoothing, or other related techniques to improve or refine the quality of received sensor data. The autonomous control system 120 will be discussed further in relation to FIG. 3.

Off-Unit Control System

In some implementations, the off-unit control system 180 includes a software architecture for supporting access and use of the earth moving system 100 and/or many different earth moving vehicles 130 through network 170. In some embodiments, operations or processing performed by the autonomous control system 120 may also be performed similarly by the off-unit control system 180. An off-unit control system 180 can include servers, server clusters, cloud-based servers, or client devices communicatively connected to one or more EMV systems. Off-unit control systems 180 may include hardware located at the work site (but not on an EMV) as well as remote hardware located off site (such as at a control center for the EMV system).

In some instances, the operation of the earth moving vehicle 130 is monitored by a human operator riding in the EMV 130 or remotely through the off-unit control system 180. Human operators, when necessary, may halt or override an automated earth moving process and manually operate (either directly or through remote control) the earth moving vehicle 130 in response to observations made regarding the features or the properties of the work site. Monitoring by a human operator may include remote oversight of all or part of an executing the earth moving routine through a graphical user interface (GUI) or other suitable means. Human operation of the earth moving vehicle 130 may also include manual control of the earth moving vehicle 130 for set portions of an earth moving routine or action or in situations where human operation is determined to be safer. A human operator can use controls of the EMV 130 such as joysticks or other physical controls or off-board controls (such as a "gamepad" style controller or computer keyboard) to control the EMV 130. Additionally, when appropriate, human operators may override all or a part of the earth moving routine/operation currently being carried out by the EMV 130.

Network

The network 170 represents the various wired and wireless communication pathways between the off-unit control system 180, off-unit sensors, and components of the autonomous EMV system 110. In some implementations, the network 170 uses standard Internet communications technologies and/or protocols. Thus, the network 170 can include links using technologies such as Ethernet, IEEE 802.11, integrated services digital network (ISDN), asynchronous transfer mode (ATM), etc. Similarly, the networking protocols used on the network 150 can include the transmission control protocol/Internet protocol (TCP/IP), the hypertext transport protocol (HTTP), the simple mail transfer protocol (SMTP), the file transfer protocol (FTP), etc. The data exchanged over the network 170 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

EMV Autonomous Control

As described above, an autonomous control system 120 of an autonomous EMV system 110 can autonomously determine desired actions (and the corresponding control signals) for the EMV 130 to perform desired earth-moving operations and routines. FIG. 3 is a block diagram of an autonomous control system of an earth moving vehicle, according to one embodiment. The autonomous control system 130 of FIG. 3 includes a sensor input module 310, an action planning module 320, an EMV interface module 330, and a calibration module 340.

The sensor input module 310 can receive and process sensor data from various sensors 160. In some implementations, the sensor input module 310 gathers sensor data indicating the current state of the EMV 130 and the surrounding environment. For example, the sensor input module 310 gather sensor data indicating actuator and/or control surface 150 positions as well as other parameters of the EMV, such as current fuel/battery level, current speed, and the like.

In some implementations, the sensor input module 310 combines sensor data from multiple sensors 160 to generate data that can be further used by the autonomous control system 120. For example, a sensor input module 310 can generate environmental data including digital environment maps of the area and terrain around the EMV 130 and soil parameters of soil or other material the EMV 130 is interacting with based on gathered sensor data. "Soil parameters," as used herein, are properties of a material surface an EMV 130 is driving over, manipulating with a tool 155, or otherwise interacting with. The sensor input module 310 and data processing steps (including the determination of soil parameters) will be discussed further below.

The action planning module 320 selects actions (for example, earth moving actions and/or routines) for the EMV 130 to execute. In some implementations, the action planning module 320 selects earth moving actions and/or routines for the EMV 130 to perform based on a current state of the EMV 130, the surrounding environment, and/or the work site in general (as determined using sensor data), and a current earth moving routine. In some embodiments, the action planning module 320 receives outside instruction on earth moving routines, for example, when the active earth moving routine is set manually by a human operator at the work site or through the off-unit control system 180.

Based on the gathered environmental data and the current state of the EMV 130, the action planning module can select and adapt an earth moving action for the current situation. In some implementations, each earth moving action is associated with a set of parameters chosen by the action planning module 320 based on the current environmental conditions and desired action by the EMV 130. For example, the parameters for an earth moving action using a tool 155 (for scooping or otherwise manipulating material) can include a set of tool path parameters governing the path of the tool 155 as the action is performed. A tool path, as used herein, represents the position of a tool 155 relative to the EMV 130 and/or the environment over time as an earth moving action is performed. In some embodiments, the action planning module 320 generates target tool paths and/or target paths for other control surfaces 150 of the EMV 130 for each earth moving actions to be performed by the EMV 130. For example, the autonomous control system 120 may select a target path of the chassis of the EMV 130 for an operation in which the EMV 130 maneuvers to a target location.

In some embodiments, the action planning module 320 dynamically tracks, updates, or repeats earth moving actions, tool paths, and/or target states for the EMV 130 based on received sensor data. For example, as the EMV 130 moves the earth moving tool 155 along a target tool path, soil friction may result in tool deviating from the target tool path, creating a different actual tool path travelled by the earth moving tool 155. In one embodiment, the action planning module 320 can repeats the same target tool path/earth moving action until the deviation between the target tool path and the actual tool path is less than a threshold or until some other outcome is achieved, such as a threshold amount of material is removed.

Similarly, when an obstruction, for example an obstacle or another earth moving vehicle 130, is determined to be within the target tool path, the action planning module 320 can store the geospatial location of the obstacle and, depending on the type of obstruction. avoid the obstacle, initiate an earth moving action 420 to remove or break up the detected obstacle, or wait for the obstacle to be manually removed (or move out of the way on its own).

In some implementations, the EMV interface module 330 translates the tool paths and/or target control surface 150 states into a set of control signals which can be transmitted to the control input 140 of the EMV 130 for execution of the earth moving action. Depending on the method of actuation of a control surface 150 (for example, hydraulic, or mechanically actuated using electrical or engine power) and the current state of the EMV 130, the magnitude of a control signal required to achieve a given effect may vary. For example, hydraulic actuators may require different amounts of hydraulic pressure to manipulate a joint into a desired position depending on the load applied to the joint and the current position of the joint. For example, raising an empty excavator bucket near to the EMV 130 requires much less force than raising an excavator bucket full of material with the EMV's arm fully extended. Similarly, weather or temperature effects, wear, variance between EMVs 130, or environmental effects can all change the effect of a given control signal on the position of the EMV 130. For example, if the ground is muddy or slippery, comparatively more forward/reverse input may be needed to achieve a desired movement of the EMV 130 than if the ground was paved. In some embodiments, the EMV interface module 330 accounts for these factors when determining control signals to reach the target state and/or tool path selected by the action planning module 320.

An EMV interface module 330 can select control signals in real-time based on the current state of the EMV 130 (which can be changing throughout the performance of the earth moving action) and the response of the EVM 130 to the current control signals. For example, if an issued control signal isn't having the desired effect (for example, if a control surface 150 is not moving to the expected position)

the EMV interface module 330 can issue a modified control signal to achieve the desired result or take other appropriate action (such as aborting the earth moving action or performing an emergency stop if the situation warrants it).

In some embodiments, the EMV interface model 330 uses a calibration of the EMV 130 to account for some or all baseline differences between the current EMV 130 and other similar EMVs of the same type or model. Due to manufacturing variations, wear, or damage, one instance of an EMV 130 may have slightly different control characteristics than another EMV (even if the EMVs 130 are of the same model and have the same control surface layout and nominal capabilities). A "calibration" or "EMV calibration," as used herein, is a set of parameters and/or unique characteristics of a given EMV 130 allowing an autonomous control system 120 to accurately control that specific EMV 130. For example, a calibration for an EMV 130 can include information on control surface geometry, relative strength of actuators for moving control surfaces 150, and the like. In some implementations, a calibration is stored as a set of speed curves mapping control signal to actuation speed for each control surface 150 of the calibrated EMV 130. Each instance of an EMV 130 can have a separately stored calibration tailored to that specific EMV 130.

In some embodiments, the calibration module 340 of the autonomous control system 120 generates and maintains a calibration for the associated EMV 130. The calibration module 340 can base calibration on pre-defined actions taken by the EMV 130 under controlled (or relatively controlled) conditions (herein, "calibration actions"). Each calibration action can include the application of one or more predetermined control signals to various control surfaces 150 in order to measure the effects of the applied control signals. For example, a calibration action could involve throttling the engine to increase the RPMs of the engine, putting the EMV 130 into gear, and measuring the resulting acceleration, resulting speed, and/or deceleration of the EMV 130 over time. Similarly, a different calibration action could include applying a predetermined control signal to a control surface 150 with a hydraulic actuator and measuring the resulting hydraulic pressure and/or the motion of the control surface 150 in response to the calibration control signal. In some implementations, the set of calibration actions includes calibration actions designed to rotate the body of the EMV 130 180 degrees (both level and on an inclined surface) as well as calibration actions for extending and retracting an excavator boom (or tool 155) of the EMV 130. One or more calibration actions can also be performed manually, while the autonomous control system 120 monitors the control signals used to perform the calibration action.

Figure 4:
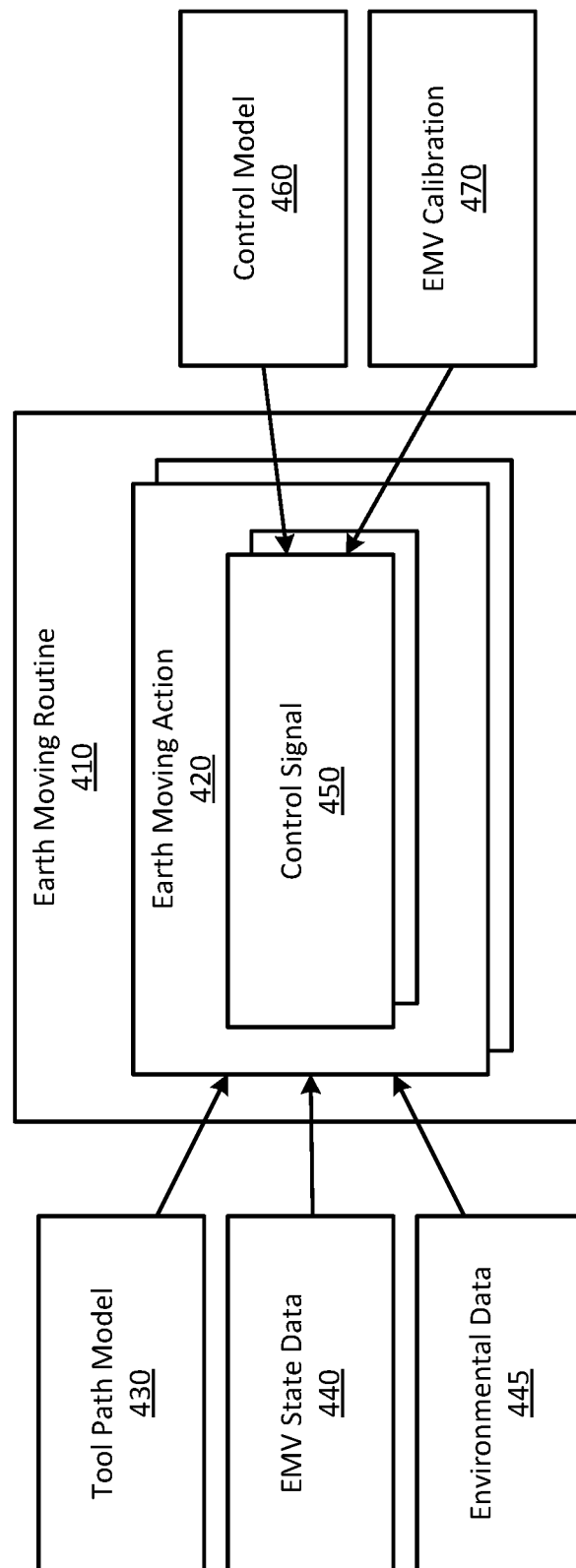
FIG. 4 illustrates an example subdivision of a routine into operations and control signals for an earth moving vehicle to perform, according to one embodiment.

FIG. 4 illustrates an example subdivision of a routine into operations and control signals for an earth moving vehicle to perform, according to one embodiment. Environment 400 includes an example earth moving routine 410 divided into a set of earth moving actions 420 each executed using one or more control signals 450. As described above, earth moving routines 410 can be associated with an objective (or task on the work site) to be completed by the EMV 130. For example, work site preparation, digging or excavation, dumping or disposal of waste, and backfill/compaction objectives can be associated with earth moving routines 410. In some implementations, an earth moving routine 410 can be associated with various parameters defining, for example, an area of the work site to excavate, the location of materials to move, the desired depth of the excavation, and the like.

As described above, an autonomous control module 120 can select and perform earth moving actions 420 to accomplish the active earth moving routine 410. In some implementations, each earth moving routine 410 (or type of earth moving routine) is associated with a set of appropriate earth moving actions 420 for that specific routine 410. For example, an earth moving routine 410 for excavating a specific area can be associated with earth moving actions 420 for scooping dirt from a given point, maneuvering to an appropriate dump location, and dumping the excavated dirt (among others).

Each earth moving action 420 can be associated with a suitable type of EMV 130, a starting state (or states) of the EMV 130 for the earth moving action 420 and a target ending state of the EMV. For example, a scooping operation can have a starting state of an EMV with an empty bucket within a certain range of the target scoop location and an ending state of the EMV with a full bucket (and the arm in a neutral position. Earth moving actions 420 possible by an excavator are not necessarily the same as the earth moving actions possible with a bulldozer, even though both EMVs 130 may be able to perform earth moving routines 410 involving moving material around a work site. As described above, the action planning module 330 can select earth moving actions 420 for an EMV 130 to perform (including selecting parameters for the earth moving actions 420). In FIG. 4, the parameters of an earth moving action 420 are influenced by a tool path model 430, EMV state data 440, and environmental data 445.

As described above, some earth moving actions 420 specify a target tool path (representing the position of the tool 155 over time) that a tool 155 will take when executing the operation 420. In some implementations, the action planning module 330 uses a tool path model to calculate or select an optimal tool path for the operation 420 based on EMV state data 440 about the current state and capabilities of the EMV 130 and environmental data 445 about the local environment of the EMV 130. For example, the tool path model 430 can take into account EMV state data 440 such as the current position and orientation of the control surfaces 150 of the EMV 130, any load on a control surface 150, and other statistics such as current fuel level etc. Similarly, the environmental data 445 can include processed sensor data such as a digital environment map of the immediate surroundings of the EMV 130 and calculated soil parameters (as described above) for a material the EMV 130 will be interacting with using its tool 155. In some implementations, the tool path model 430 is a machine learning model trained and maintained by the action planning module 330. The tool path model 430 will be discussed further below.

In some implementations, each earth moving action 420 can be translated into a set of control signals 450 which perform the earth moving action 420 when executed by the EMV 130. As described above, the EMV interface module 330 can generate control signals 450 associated with various control surfaces of the EMV 130 based on their target positions in the earth moving action, a control model 460 modeling the response of each control surface 150 to control signal input, and an EMV calibration 470 for the EMV 130. In some implementations, the control model 460 can predict the response of a control surface 150 to a given control signal based on the EMV state 440, environmental data 445, and the EMV calibration 470. For example, the magnitude, timing, and other parameters for a control signal 450 can be selected based on the control model 460. The control model 460 and EMV calibration 470 will be discussed further below.

Sensor Data Processing

As described above, the input module 310 receives and processes sensor data from various sensors 160 to generate EMV state and environmental data 440 and 445 that can be used to inform autonomous actions (such as earth moving actions 420) taken by the EMV 130.

For example, the sensor input module 310 can receive raw sensor data from a variety of sensors 160 (for example, multiple cameras mounted on different parts of the EMV 130) and combine the received data into a digital environment map of the environment surrounding the EMV 130 using simultaneous localization and mapping (SLAM) techniques. Similarly, the sensor input module 310 may perform other processing operations, such as up sampling, down sampling, interpolation, filtering, smoothing, or the like to improve the quality or useability of received sensor data. The sensor input module 310, according to some embodiments, uses one or more machine learning models to process received sensor data for use by the autonomous control system 120. As described above, the calculated environmental data (including soil parameters) can then be incorporated into the selection and execution of EMV operations 420 as EMV state data 440 or environmental data 445.

In some implementation the sensor input module 310 accesses, generates, or maintains a detailed map of the work site and/or the environment surrounding the EMV 130. The work site map can include image files describing the geographic layout of the work site as a function of location within a coordinate space of the work site, with different images representing a dig location, fill location, an entry ramp, etc. In some implementations, the work site map includes information on the current state of the work site, tasks the EMV 130 is intended to perform (for example, marking a volume for the EMV 130 to excavate), and the target state of the work site once EMV operations are completed. For example, a dig location may be characterized by a set of target volume dimensions which should be achieved upon the conclusion of an earth moving routine. Additionally, the fill location (where excavated material is deposited) may be included in the work site map. When appropriate, the work site map can describe the location of fiducials representing technical pieces of equipment previously placed at the work site such as stakes with active emitters and grade stakes.

The sensor input module 310 can, according to some embodiments, register the current position of the EMV 130 on the work site by aligning/registering the digital environment map (generated based on sensor data captured from the EMV 130) with the work site map (containing known information about the layout of the work site) using the known locations of fiducials and other locations within the work site common to both representations. Position data from a position sensor 145 such as a GPS or the boundaries of the work sites provided by both representations may also be used by the sensor input module 310.

In some implementations, the sensor input model 310 measures or infers information about tools 155 of the EMV 130. For example, the sensor input model 310 can use sensor data to determine the fill level of an excavator bucket or other tool. The fill level of the tool describes the volume of earth in or being manipulated by a tool 155 and can be determined by the autonomous control module 120 using many different methods. For example, fill level can be estimated mathematically by integrating the depth of the leading edge beneath the ground surface over the distance traveled by the tool 155 beneath the ground surface, using a trained machine learning model, based on imagery or other data from sensors 160, or by inference using a kinematic force being exerted on the tool 155 by the material it's traveling through and/or soil parameters of the material.

Commonly, soil parameters are calculated for a soil or dirt surface being dug into or driven through by an EMV 130, but soil parameters can also be calculated for suitable non-soil materials (such as construction aggregate or gravel). Soil parameters can include a soil/material resistance factor (a catch-all soil parameter measuring the relative amount of force needed to move a tool 155 through the material relative to other types of material) and/or more granular measures expressed in separate parameters such as soil expansion, cohesion, density, traction level, and the like. In some implementations, the sensor input module 310 uses a trained soil parameter model to determine one or more soil parameters of material the EMV 130 is currently interacting with based on sensor data measuring the current speed of a tool 155 through the material and a corresponding kinematic pressure on the tool 155. In some implementations, the kinematic pressure represents not only the current pressure/force on the tool 155, but the force exerted on the tool over time. A kinematic pressure on a tool 155 can be determined using a specialized force or pressure sensor built into the tool 155 or inferred based on other sensor measurements or the state of the vehicle (such as an amount of control input or hydraulic pressure needed to maintain the tool 155 in its current position/state).

Figure 5:
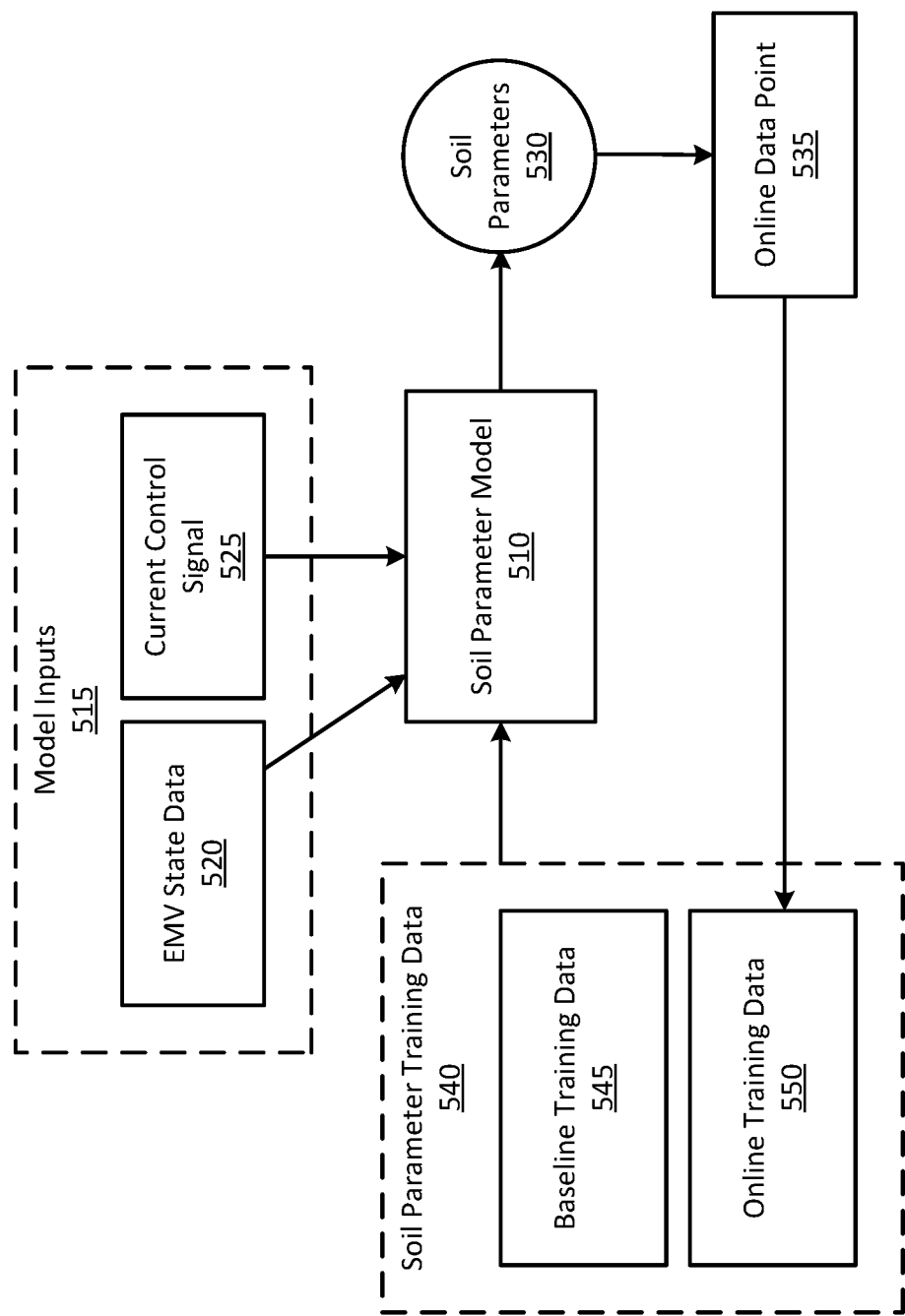
FIG. 5 is a block diagram of an example machine learning soil parameter model for an earth moving vehicle, according to one embodiment.

FIG. 5 is a block diagram of an example machine learning soil parameter model for an earth moving vehicle, according to one embodiment. FIG. 5 includes a soil parameter model 510 which identifies one or more soil parameters 530 of a material the EMV 130 is currently interacting with based on inputs 515 including EMV state data 520 and/or current control signals 525 being sent to the EMV 130. In some implementations, the soil parameter model 510 can also take input of a baseline soil type (such as "high clay soil" or "sand") which is set manually, based on the location of the work site, or through other suitable methods. In the embodiment of FIG. 5, the soil parameter model 510 is trained on soil parameter training data 540 including a combination of baseline training data 545 and online training data 550. As described above, online learning is a machine learning technique where the ML model is constantly updated based on newly received data points. When the autonomous control system 120 uses the predicted soil parameters 530 for the EMV 130 to inform interactions with material (such as soil or earth), the observed results of these interactions become online data points 535 used as online training data 550 to update the soil parameter model 510. In some implementations, the soil parameters determined by the soil parameter model 510 can be used to inform EMV 130 path planning, volume generation (such as how much soil to scoop at once), and the like.

The autonomous control system 120 can use soil parameters to determine the amount of power/force put into a given action (through changing the magnitude of a control signal or using alternate methods of actuating the tool) to adjust or maintain a desired tool speed, achieve penetration of the ground surface, and/or break out of the ground while performing a given action. Similarly, the autonomous control system 120 can vary tool parameters other than tool speed and tool force, such as angle of attack and angle when lifting out of the ground based on soil parameters.

A soil parameter model 510 can be initialized by training the model based on baseline training data 545. In some embodiments, the baseline training data 545 contains a set of training data comprising data points gathered from a variety of different soil and material types including example model inputs and corresponding soil parameters for each type of soil. Once the soil parameter model 510 is initialized, the online machine learning process can begin as the EMV 130 begins interacting with material. In some embodiments, the autonomous control system 120 stores a pre-trained baseline soil parameter model which is copied any time a soil parameter model 510 is initialized.

In some implementations, the EMV state data 520 includes a current tool speed for tool 155 currently interacting with the material. For example, the tool 155 can be an excavator/loader bucket or bulldozer blade which is scooping through or pushing material. The soil parameter model 510 can also input one or more current control signals 525 the EMV 130 is executing. EMV control signals can be used to estimate an amount of kinematic pressure exerted by the tool on the material (and correspondingly, by the material on the tool). For example, the current amount of force exerted by a hydraulic cylinder can be regulated by a control signal to the corresponding control surface 150. In other implementations, the current kinematic pressure on a tool is directly collected or inferred as part of gathered sensor data. For example, some tools 155/control surfaces 150 may have inbuilt pressure sensors to measure how much force is being exerted on the tool 155 or control surface 150. In some implementations, the soil parameter model 510 can also take input of kinematic pressure over time. For example, a relatively constant kinematic pressure may indicate a uniform material, while kinematic pressure that spikes and gives way intermittently may indicate a rocky material that exhibits strong resistance at first, then breaks free all at once.

In some embodiments, each suitable interaction between the tool 155 of the EMV 130 and soil or other material is measured and used as an online data point 535. Online data points 535 can be used to update the soil parameter model 510 without requiring full retraining of the model. In these implementations, the effective training set grows over time as the amount of online training data 550 taken into account by the model 510 grows, but the soil parameter model 510 does not need to be trained on the full training data set 540 (including all baseline data 545 and online data 550) in one batch. In some embodiments, online data points 535 are discarded soon after being used to update the soil parameter model 510. Alternatively, online data points 535 can be archived and/or sent to the off-unit control system 180 for later use (for example, for inclusion in the baseline training data 545 for future EMVs 130).

In some embodiments, the soil parameter model 510 is re-initialized periodically so that the soil parameter predictions are adapted to current soil conditions. For example, the soil parameter model 510 may be re-initialized (reset to use only baseline training data 545) at the start of each day and/or work session to account for soil condition changes overnight (or since the EMV 130 was last used). For example, overnight rain or other weather events could alter the soil/material properties enough that using a soil parameter model 510 trained on the previous day could be counterproductive (producing worse results or impeding the soil parameter model 510 from quickly adapting to new work site conditions).

Tool Path Optimization

As described above, the action planning module 320 selects actions (for example, earth moving actions and/or routines) for the EMV 130 to execute based on the gathered environmental data and the current state of the EMV 130. Earth moving actions 420 can be associated with a set of parameters including tool path parameters governing the path of the tool 155 as the action is performed. As described above, a tool path represents the position of a tool 155 relative to the EMV 130 and/or the environment over time. A target tool path can include target positions of one or more control surfaces 150 at various points in the tool path.

Figure 6:
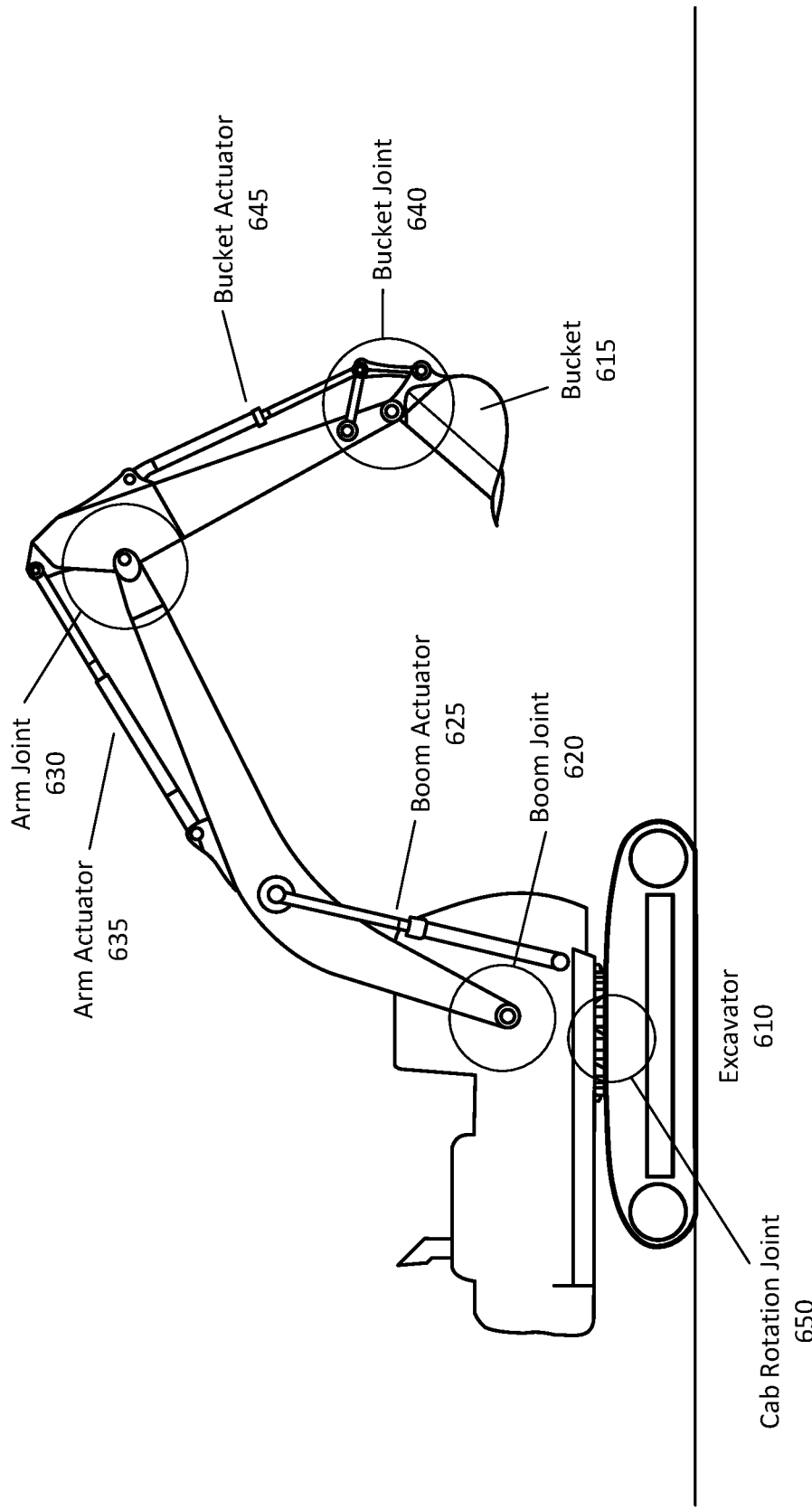
FIG. 6 illustrates example placement of control surfaces for an excavator, according to one embodiment.

An EMV 130 generally has many control surfaces 150, including control surfaces associated with a tool 155 of the EMV 130. FIG. 6 illustrates example placement of control surfaces for an excavator, according to one embodiment. The environment 600 includes an excavator 610 with a bucket 615 and multiple joints, including a cab rotation joint 650 and an arm assembly including a boom joint 620, arm joint 630, and bucket joint 640. Additionally, some joints highlighted in FIG. 6 are associated with a corresponding hydraulic actuator, such as the boom actuator 625 for the boom joint 620, arm actuator 635 for the arm joint 630, and bucket actuator 645 for the bucket joint 640. The excavator 610 may have additional control surfaces not depicted in FIG. 6 (for example, control surfaces 150 related to skid steer control of the tracks of the excavator 610).

FIG. 6 shows several control surfaces 150 of an example excavator 610 (the boom joint 620, arm joint 630, and bucket joint 640) and the control mechanisms that actuate the control surfaces 150 (the boom actuator 625, arm actuator 635, and bucket actuator 645, respectively). In some implementations, the bucket 615 is a tool 155 of the excavator, and the boom joint 620, arm joint 630, and bucket joint 640 are control surfaces 150 which allow the tool 155/bucket 615 to be manipulated through a desired tool path through control signals controlling the corresponding actuators 625, 635, and 645.

Figure 7:
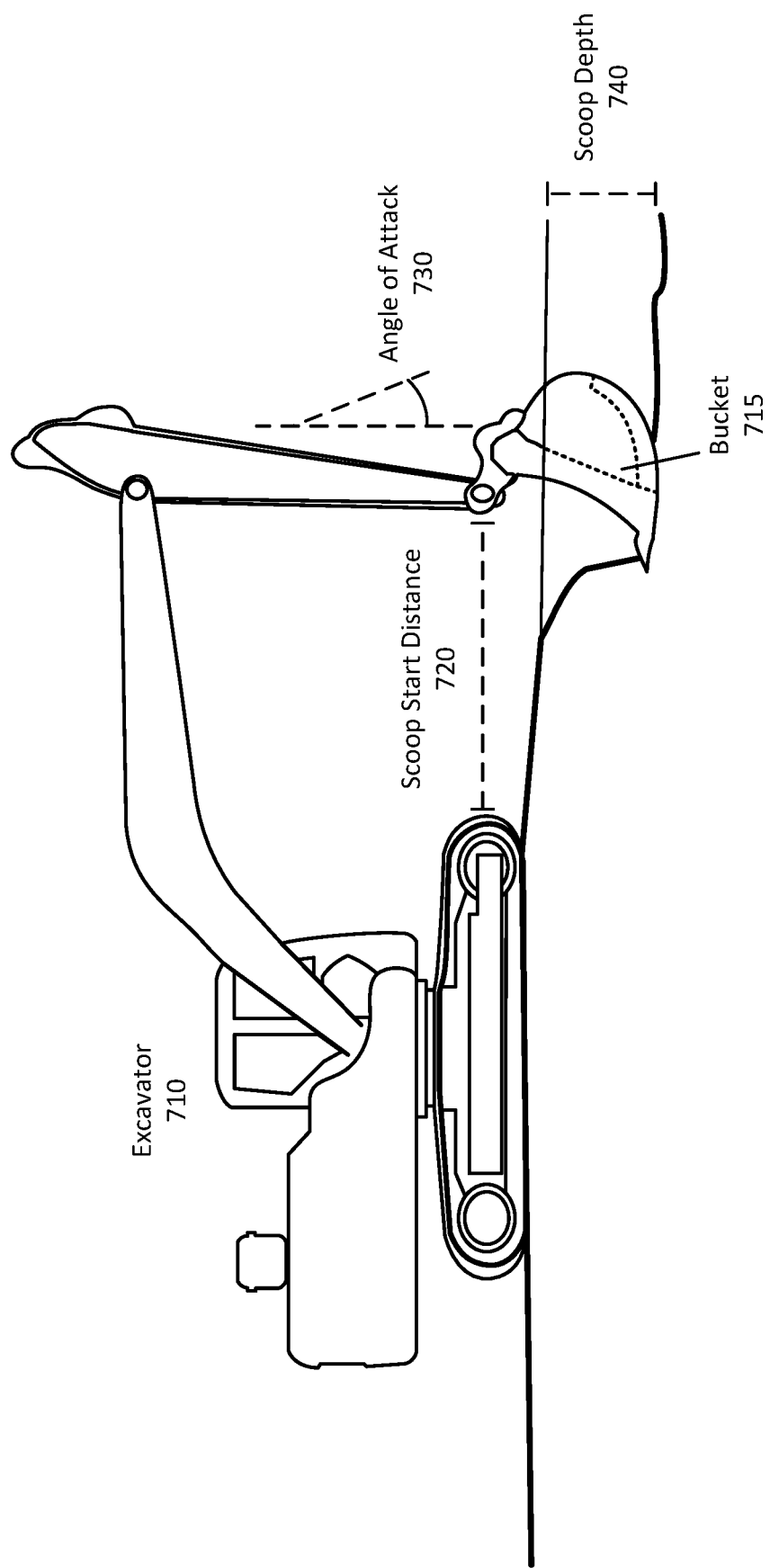
FIG. 7 illustrates example tool path parameters of a scooping operation for an excavator, according to one embodiment.

FIG. 7 illustrates example tool path parameters of a scooping operation for an excavator, according to one embodiment. The environment 700 of FIG. 7 includes an excavator 710 (a type of EMV 130) performing a scooping earth moving action 420 using its bucket 715 (a tool 155). Example tool path parameters of the scooping operation include the scoop start distance 720, angle of attack 730, and scoop depth 740. The scoop start distance 720 controls how far away from the excavator 710 chassis the bucket 715 will initially enter the ground surface (a shorter scoop start distance 720 provides greater leverage for the excavator 710 but may result in more maneuvering the chassis on consecutive scoops). Similarly, the angle of attack 730 controls the angle of the bucket 715 when it enters and travels through the ground and the scoop depth 740 measures how far the bucket 715 will penetrate below the surface of the material during the operation. Additionally, an excavator scooping earth moving action can have additional tool path parameters, such as a target speed of the scooping motion, a state of the tool, and a target bucket 715 fill amount for the scoop.

Depending on the parameter and earth moving action 420, tool path parameters can represent specific metrics (such as an angle or distance at a certain point in the tool path), can be binary values (for example, if ground stabilizers are deployed during the operation 420 or if a jackhammer tool 155 is active or not), or may be associated with one or more archetypal tool paths which are blended based on the parameter value. For example, the scoop depth parameter 740 can be associated with tool paths for a "deep scoop" and a "shallow scoop" which are blended based on the scoop depth parameter 740 to determine the target tool path for the operation 420.

The selection of tool path parameters can meaningfully affect the efficacy of the earth moving action 420. For example, the angle of attack 730 of the bucket 715 beneath the ground surface during an excavation action can be adjusted to reduce the rate at which the earth moving tool 155 collects excavated earth. The rate of excavation can be at its highest when the bucket 715 is angled perpendicular to the flat ground surface, and the lowest when the bucket 715 is angled parallel to the flat ground surface. Additionally, at lower speeds, the EMV 130 is generally often better able to maintain the optimal bucket angle of attack 730 for excavating earth.

As described above, the action planning module 320 can generate one or more candidate tool paths for performing a selected earth moving action 420. In implementations where the work site is represented in the digital terrain model as a coordinate space, for example the implementations described above, a target tool path includes a set of coordinates within the coordinate space. Target tool paths may describe a variety of shapes representing a variety of earth moving techniques, for example substantially rectangular pathways in two dimensions, substantially triangular pathways in two dimensions, hyperrectangular pathways in three dimensions, hyperrectangular pathways in three dimensions, elliptic pathways in two dimensions, hyperelliptic pathways in three dimensions, or curved lines along the plane of the ground surface. An earth moving action 420 can involve the execution of multiple tool paths, such as in the case of repetitive actions, actions that require coordination between multiple tools 155 or EMVs 130, or complex actions with multiple stages.

For example, for holes of greater volumes or requiring a graded excavation, action planning module 320 may generate multiple target tool paths gradually building the size and/or depth of the excavation. As a result, a target tool path may represent instructions for excavating only a fraction of the total volume of the excavation. In some implementations, the last tool path used at the conclusion of the excavation is a finish tool path, which digs minimal to no volume and primarily evens the surface of the bottom of the excavation.

Figure 8:
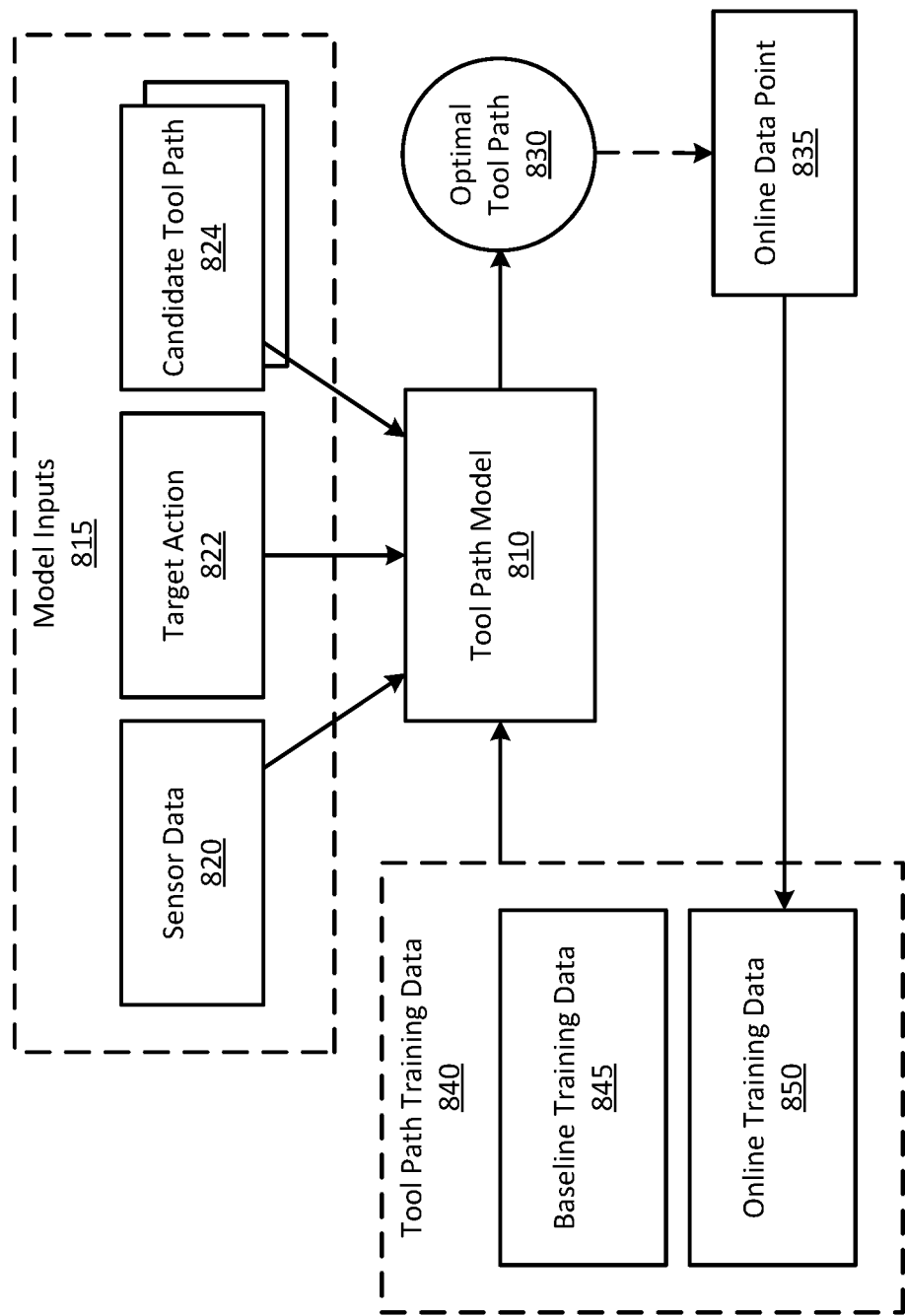
FIG. 8 is a block diagram of an example machine learning tool path model for an earth moving vehicle, according to one embodiment.

In some embodiments, the action planning module 320 generates one or more candidate tool paths which are evaluated and optimized to select the target tool path for the earth moving action 420. In some implementations, the autonomous control system 120 maintains and updates a machine learning model trained to determine an optimal tool path for a given operation 420 based on the current state of the EMV 130 and the work site. FIG. 8 is a block diagram of an example machine learning tool path model for an earth moving vehicle, according to one embodiment. FIG. 8 includes a tool path model 810 which identifies an optimal tool path 830 of a material the EMV 130 is currently interacting with based on inputs 815 including sensor data 820, a target action 822, and a set of candidate tool paths 824. In the embodiment of FIG. 8, the tool path model 810 is trained on tool path training data 840 including a combination of baseline training data 845 and online training data 850. As described above, online learning is a machine learning technique where the ML model is constantly updated based on new online data points 835 created based on the observed results of the optimal tool paths 830 previously selected by the tool path model 810. In some implementations, the autonomous control system 120 maintains a set of tool path models 810, each trained to optimize tool paths for different types of action. For example, the autonomous control system 120 of an excavator 710 can maintain a tool path model 810 trained to optimize scooping actions and a separate tool path model 810 for dumping actions.

Depending on the implementation and the target action 822, the tool path model 810 can be trained to optimize for one or more action conditions in the selection of a tool path. As used herein, an action condition is a metric or measurement that the tool path model 810 is configured to optimize for. For example, action conditions can include efficacy of the target action, fuel/energy efficiency of the tool path, speed of the tool path, amount of force required to complete the tool path, volume of material affected by the tool path, or amount of motion required of a set of control surfaces 150 (such as preferring tool paths that do not require moving the chassis of the EMV 130). Similarly, an action condition can optimize for the number of repetitions of a repeated action (for example, the number of scoops needed to complete a target excavation). To optimize the tool path, the tool path model 810 can select values for one or more tool path parameters as described above in relation to FIG. 7.

Like the soil parameter model 510, the tool path model can be initialized by training on baseline training data 845. In some embodiments, the baseline training data 845 contains a set of training data comprising data points gathered from a different times one or more target actions were performed in different EMV states and environmental conditions (as measured by the sensor data 820). Once the tool path model 810 is initialized, the online machine learning process can begin as the EMV 130 performs the target action 822.

In some implementations, the sensor data 820 includes state data for the EMV 130 and environmental data about the surrounding environment of the EMV 130. For example, the angle of the EMV 130, the current fuel level of the EMV 130, or calculated soil parameters can affect tool path selection. For example, a high soil resistance factor can influence tool paths to account for greater force needed to accomplish the target action 822 through high resistance material (for example, performing scooping actions closer to the chassis of the EMV 130 or choosing a more vertical angle of attack).

The set of candidate tool paths 824 can include a plurality of candidate tool paths that can be separately evaluated and compared by the tool path model 810 and/or one or more template tool paths that the tool path model 810 can select from, modify, or blend together (depending on the implementation) to arrive at an optimal tool path 830 for a given situation. Each candidate tool path 824 can be associated with one or more calculated statistics, such as a baseline time to complete the tool path (for example, based on the distance the tool/EMV 130 needs to travel to complete the tool path). In some implementations, the action planning module 320 can procedurally generate a set of candidate tool paths can be generated by blending between a set of template tool paths and/or randomly varying one or more tool path parameters of a tool path (such as attack angle 730 for a scoop action). In other implementations, the action planning module 320 iteratively tunes a single candidate tool path 824 using the tool path model 810. A candidate tool path can be generated based on a template tool path (a generic tool path for a given earth moving action) or based on one or more recent tool paths used for that earth moving action. For example, in the case of a repetitive action a candidate tool path can be generated by averaging (or otherwise combining) several of the most recent tool paths used for that action. Previous tool paths can be combined by averaging key frames of the tool path, tool path parameters, and the like (depending on the embodiment). A candidate tool path can be generated in this way using a weighted average (for example, heavily weighting the tool path for the most recent use of that action by the EMV 130) or another suitable statistical method.

For example, to determine an optimal tool path 830 from a set of candidate tool paths 824, the action planning module 320 can apply the tool path model 810 to each of the candidate tool paths 824 to determine a score or metric of each candidate tool path 824 with respect to one or more action conditions based on the target action 822 and sensor data 820. Once each candidate tool path 824 is evaluated by the tool path model 810 (with respect to one or more action conditions, as described above), the tool path model 810 and/or action planning module 320 ranks the set of candidate tool paths based on the to arrive at the optimal tool path 830 for the earth moving action 420. In other implementations, the tool path model 810 can be used to evaluate a candidate tool path 824 against one or more threshold scores. If the candidate tool path 824 does not meet the threshold criteria, the candidate tool path 824 can be iteratively refined to improve the evaluation by the tool path model 810 (and then re-evaluated).

In some embodiments, each time the EMV 130 performs the target action 822 sensor data is gathered and used as an online data point 835 for that action. As described above, online data points 835 can be used to update the tool path model 810 without requiring full retraining. As the EMV 130 executes the earth moving action 420 using the selected optimal tool path 830, the action conditions of the selected tool path 830 can be measured (using sensors 160 etc.) and used as an online data point 835 to update the tool path model 810. Similar to the soil parameter model 510, observed online data points 835 can be discarded soon after being used or archived for later use (for example, for inclusion in the baseline training data 845 for future EMVs 130).

EMV Control Model

As described above, a control surface 150 of an EMV 130 may react differently to a received control signal based on the current state and environmental conditions of the EMV. Depending on the type of control input 140 and the characteristics of the specific control surface 150 getting predictable results from a selected control signal (which can be important to safe and effective autonomous operation) can be nontrivial.

In some embodiments, control signals applied through a mechanical control input (or a retrofitted manual control input) have limited precision. For example, control signals applied to mechanical controls for hydraulic control surfaces 150 can be restricted to a simple left/right or on/off scale adapted from manual controls for that control surface 150.

Similarly, certain control surfaces 150 (especially those that have significant weight on them) may have a fixed (or not directly controllable) deceleration rate due to inertia and the way the control surface 150 was constructed. For example, the cab/chassis rotation joint 650 of the excavator 615 (i.e. the joint that allows the tracks of excavator 615 to rotate independently of the main body of the excavator) can exhibit substantial inertia once moving. In this case, cab of the excavator 615 cab will continue rotating due to inertia after the control signal instructing the cab/chassis rotation joint 650 to rotate has ended (or even been reversed). In some implementations, the EMV interface module 330 uses one or more machine learning models (control models 460) to translate a desired action or target position of a control surface 150 into one or more control signals of the proper type and magnitude to achieve the desired end state in the current environment. For example, the EMV interface module 330 can use the control model 460 to achieve a desired cab rotation by sending a control signal to the cab/chassis rotation joint 550 such that the cab naturally slows to a stop at the desired position.

In some implementations, the EMV interface module 330 can dynamically adjust control signals to maintain a target tool path or achieve a target state of one or more control surfaces 150. For example, adjusting the angle of a tool 155 to a shallower depth or angle to maintain a desired tool speed based on soil parameter data or deviation from an expected tool speed. Similarly, in some implementations the EMV interface module 330 times control signals to account for hydraulic response delay or adjusts sequencing of control signals based on a learned total hydraulic capacity of the EMV 130 (accounting for or preventing losing hydraulic power when trying to move multiple hydraulic circuits at the same time).

Figure 9:
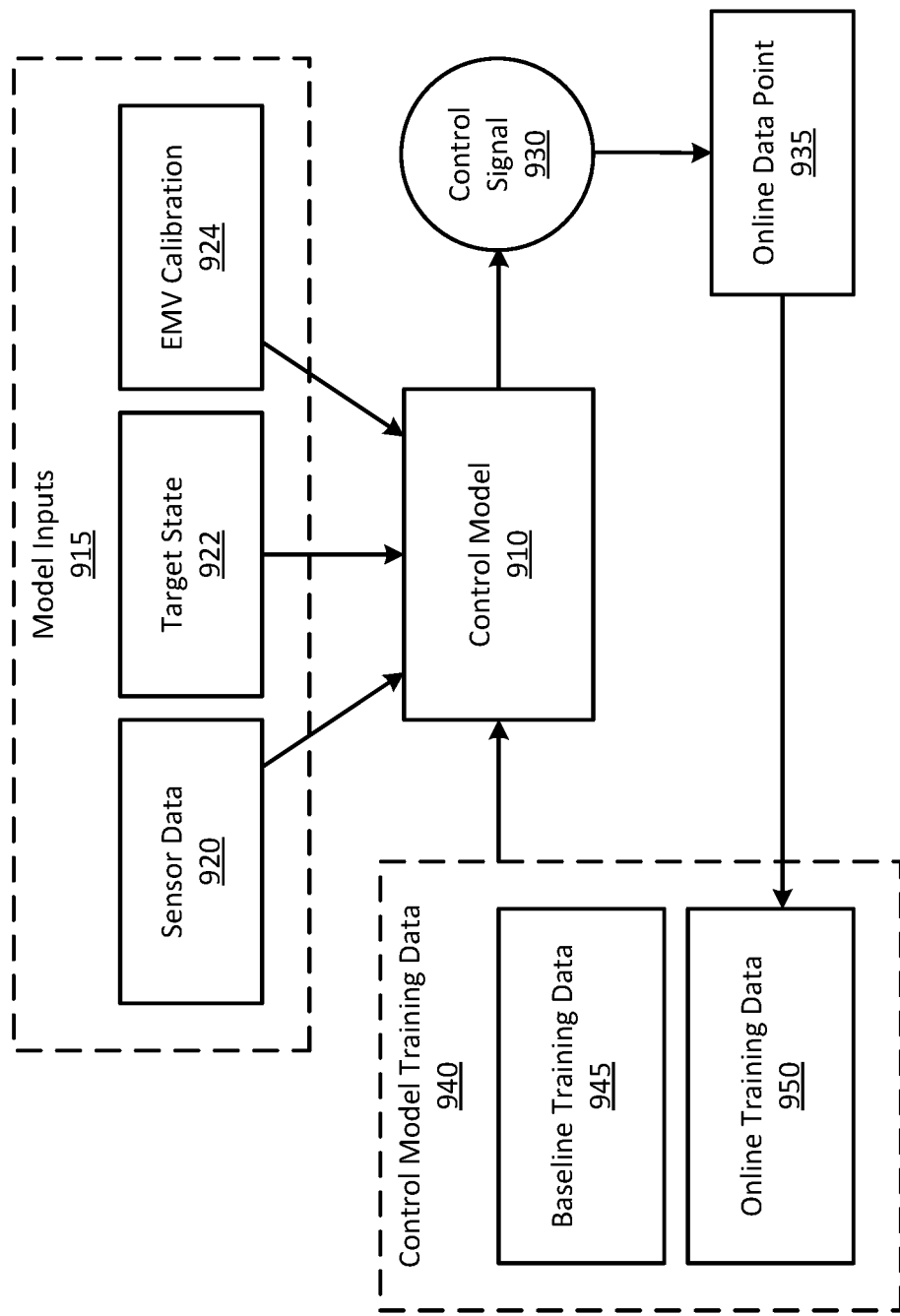
FIG. 9 is a block diagram of an example machine learning control model for an earth moving vehicle, according to one embodiment.

FIG. 9 is a block diagram of an example machine learning control model for an earth moving vehicle, according to one embodiment. FIG. 9 includes a control model 910 which selects a control signal 930 to achieve a target state 922 of the EMV 130 based on inputs 915 including sensor data 920 measuring the actual state of one or more control surfaces 150, the target state 922 of one or more control surfaces 150, and, in some implementations, an EMV calibration 924. In the embodiment of FIG. 9, the calibration model 910 is trained on control model training data 940 including a combination of baseline training data 945 and online training data 950. As described above, online learning is a machine learning technique where the ML model is constantly updated based on new online data points 935 created based on the observed results of the application of the control signals 930 previously generated by the control model 910. In some implementations, the autonomous control system 120 maintains a set of control models 910, each trained to determine control signals 930 for different types of earth moving action. When applied in practice, the control model 910 can generate control signals 930 that can be applied to one or more control surfaces 150 to achieve the target state 922.

In some implementations, the sensor data 920 includes state data for the EMV 130 and environmental data about the surrounding environment of the EMV 130 (such as the angle of the EMV 130 or the load on the EMV 130 can affect control signal selection). Similarly, the target state 922 of the EMV can be used as an input for the control model 910. For example, the current and target states of the EMV 130 can be compared as part of determining the types and magnitudes of control signal 930 to apply. Additionally, the EMV calibration 924 can inform how much the EMV 130 will react to a given magnitude of control signal. the EMV calibration 924 will be discussed further below.

Like the soil parameter model 510, the control model can be initialized by training on baseline training data 945. In some embodiments, the baseline training data 945 contains a set of training data comprising data points gathered from a different times one or more target actions were performed in different EMV states and environmental conditions (as measured by the sensor data 920). Once the control model 910 is initialized, the online machine learning process can begin as the EMV 130 performs the earth moving actions.

In some embodiments, each time the EMV 130 performs an earth moving action based on a control signal 930 generated from the control model 910, the result of the control signal 930 can be measured and (along with the target state 922 associated with that earth moving action) used as an online data point 935 for that earth moving action.

Each online data point 935 can include the initial state of the EMV 130, the applied control signal (and target state for that control signal) and the actual state of the EMV 130 after the control signal was executed. As described above, online data points 935 can be used to update the control model 910 without fully retraining the model. Similar to the soil parameter model 510, observed online data points 935 can be discarded soon after being used or archived for later use (for example, for inclusion in the baseline training data 945 for future EMVs 130).

EMV Calibration Model

As described above, the autonomous control system 120 can use a calibration to account for some or all differences between the current EMV 130 and other similar EMVs of the same type or model (for example, due to manufacturing variations, wear, or damage). An EMV calibration can include information on control surface geometry and the relative strength of actuators for moving control surfaces 150 and may be stored as a set of speed curves mapping control signal to actuation speed for control surfaces 150 of the calibrated EMV 130.

In some implementations, the calibration process is periodically revisited as the calibration drifts out of line with real world performance (indicating wear on the EMV 130 to the extent that it alters baseline performance of the EMV 130). The calibration module 340 can adjust the calibration for the wear, re-do the calibration process, and/or notify the off-unit control system 180 that maintenance needs to be performed depending on the severity of the performance drift.

The calibration module 340 can generate and maintain EMV calibrations by instructing the EMV 130 to perform a set of specific calibration actions. Each type of calibration action can be associated with a set of predetermined control signals for various control surfaces 150. The calibration for the EMV 130 can be determined based on the EMV 130's response to each of the calibration actions in a neutral setting (for example, how much each control surface 150 moved in response to the calibration action). In some implementation, the calibration process continues until the EMV calibration achieves a threshold level of precision (such as when the calibration accurately predicts the outcome of the calibration actions).

Figure 10:
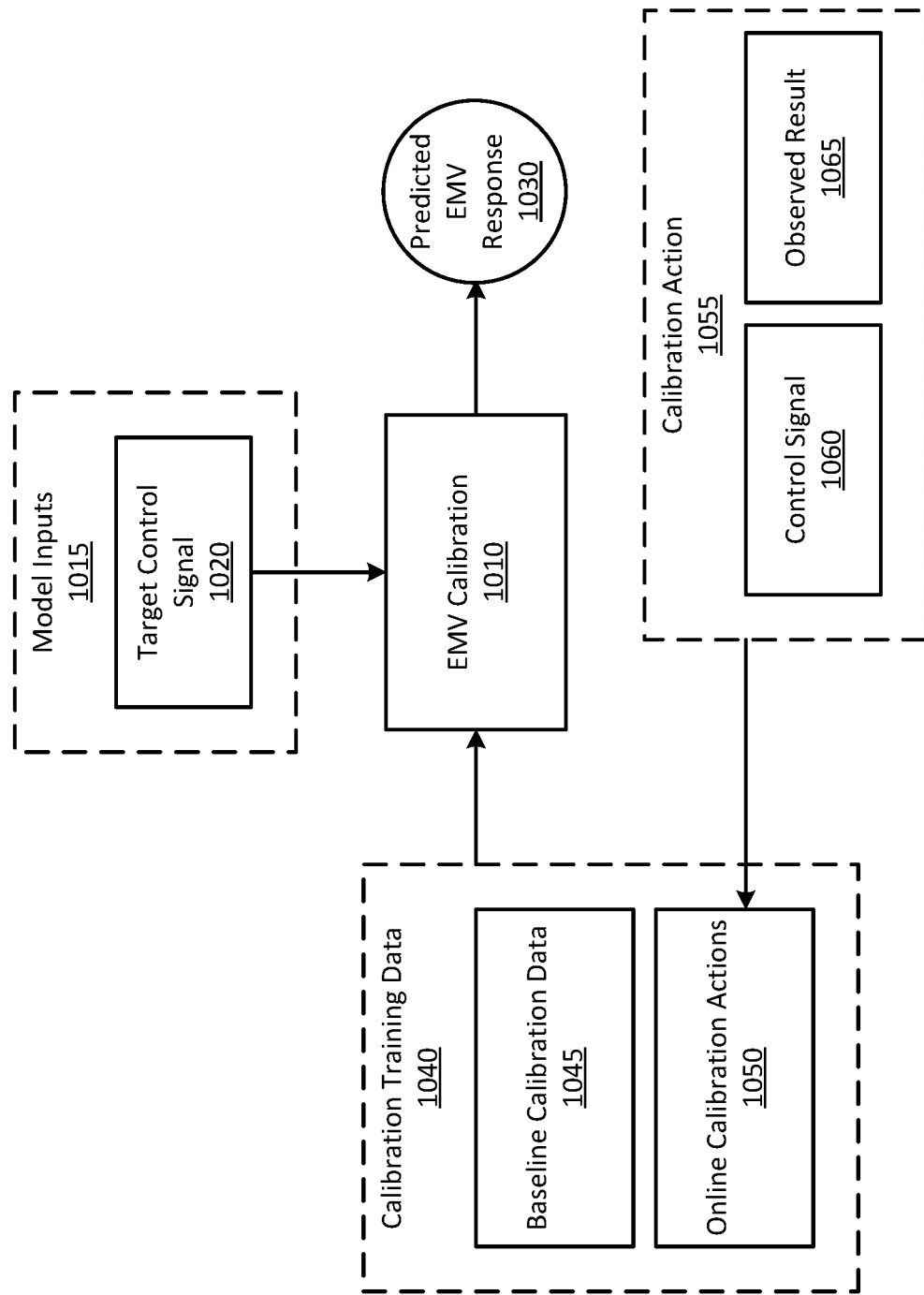
FIG. 10 is a block diagram of an example machine learning calibration model for an earth moving vehicle, according to one embodiment.

In some implementations, the autonomous control system 120 generates an EMV calibrating by training a machine learning model based on the EMV 130's performance of one or more calibration actions. FIG. 10 is a block diagram of an example machine learning calibration model for an earth moving vehicle, according to one embodiment. FIG. 10 shows an EMV calibration 1010 which is iteratively refined as the EMV 130 performs a series of calibration actions 1055. The EMV calibration 1010 can map an input 1015 control signal 1020 to a predicted EMV response 1030 (for example, in the form of a speed curve mapping control magnitude to actuation speed of one or more control surfaces 150).

In the embodiment of FIG. 10, the EMV calibration 1010 is trained on calibration training data 1040 including a set of stored baseline calibration actions 1045 and a set of online calibration actions 1050 performed by the EMV 130. As described above, online learning models are trained iteratively as new data points are received and factored into the model. For example, each calibration action 1055 of the set of online calibration actions 1050 can include a control signal 1060 (the input to the EMV calibration 1010) and an observed result 1065 of one or more control surfaces 150 responding to the control signal 1060 (the target output of the EMV calibration 1010). In some implementations, the EMV calibration 1010 is trained iteratively as the EMV 130 runs through a calibration routine of calibration actions 1055. As described above, the EMV calibration 1010 can be iteratively refined using online learning without fully retraining the model after each calibration action 1055. Similar to the soil parameter model 510, observed calibration actions 1055 can be discarded soon after being used or archived for later use (for example, for inclusion in the baseline calibration data 1045 for future EMVs 130).

In some implementations, the EMV calibration 1010 is locked (and not updated) unless the EMV 130 performing one of a set of specific calibration actions 1055 or is in a calibration mode. In some implementations, calibration actions 1055 are designed to isolate and test the responses of control surfaces 150 to various magnitudes of control signals. An EMV calibration 1010 can be initialized using baseline calibration data 1045 containing, in some implementations, data from another instance of the same type of EMV 130. In some implementations, the baseline calibration data 1045 includes a pre-trained baseline calibration that can be adapted to the specific EMV 130 through online learning. As described above the calibration process can be repeated (starting from the baseline calibration) or refined (by performing more calibration actions) when performance drift from the baseline calibration is detected.

EMV Autonomous Control Routines

Figure 11:
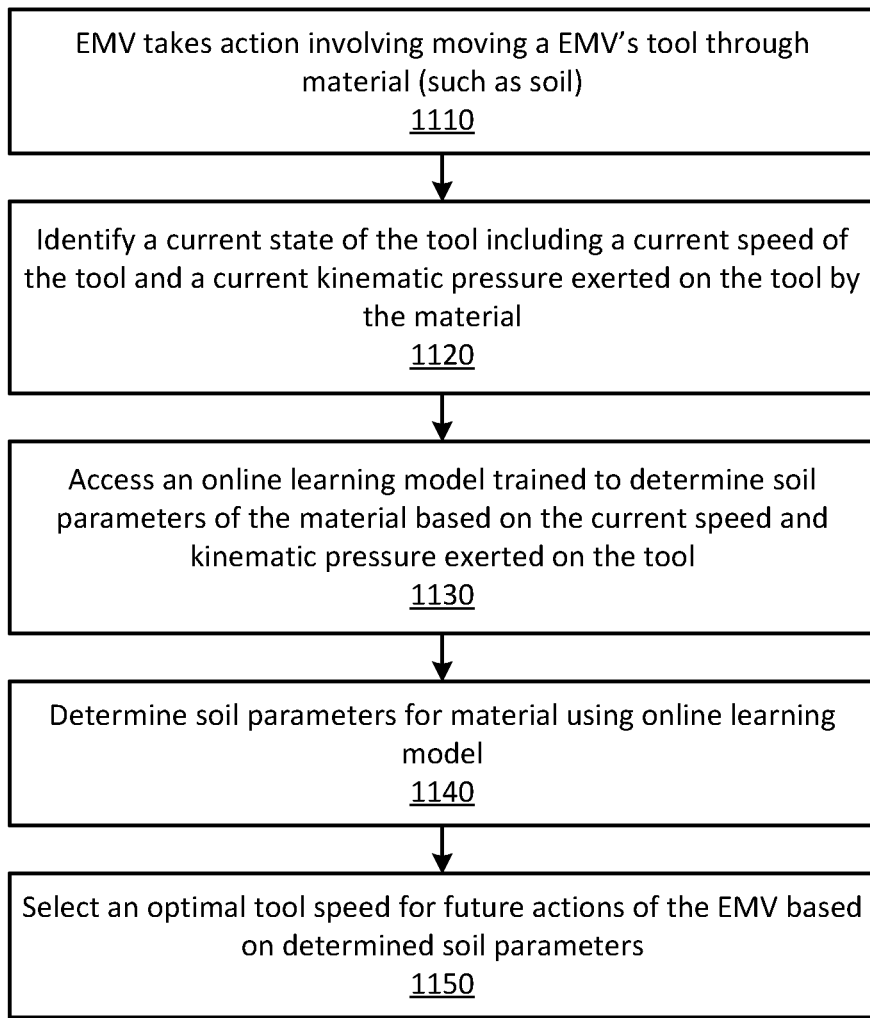
FIG. 11 is a flowchart describing a process for determining soil parameters of soil interacted with by an earth moving vehicle using a machine learning soil parameter model, according to one embodiment.

As described above, the autonomous control system 120 maintains a soil parameter model trained to determine soil parameters of material the EMV is interacting with. FIG. 11 is a flowchart describing a process for determining soil parameters of soil interacted with by an earth moving vehicle using a machine learning soil parameter model, according to one embodiment. The process 1100 begins when an EMV takes 1110 an action that involves a tool of the EMV moving through or otherwise interacting with soil (or other similar material as described above). For example, scooping or dumping soil as part of an excavation. The autonomous control system associated with the EMV can then identify 1120 a current state of the tool (including a current speed/velocity of the tool and kinematic pressure currently exerted on the tool) based on sensor data. To predict soil parameter, the autonomous control system accesses 1130 an online learning model trained to determine soil parameters of the material based on the current speed and kinematic pressure exerted on the tool (or other information about the state of the tool). Using the identified tool state information as an input to the online learning model, the autonomous control system determines 1140 a set of soil parameters for the material the EMV is currently interacting with. Finally, the autonomous control system can use the determined soil parameters to inform future actions by the EMV. For example, the autonomous control system can select 1150 an optimal tool speed, tool path, or other tool property based on a determined soil resistance factor of the material being interacted with.

Figure 12:
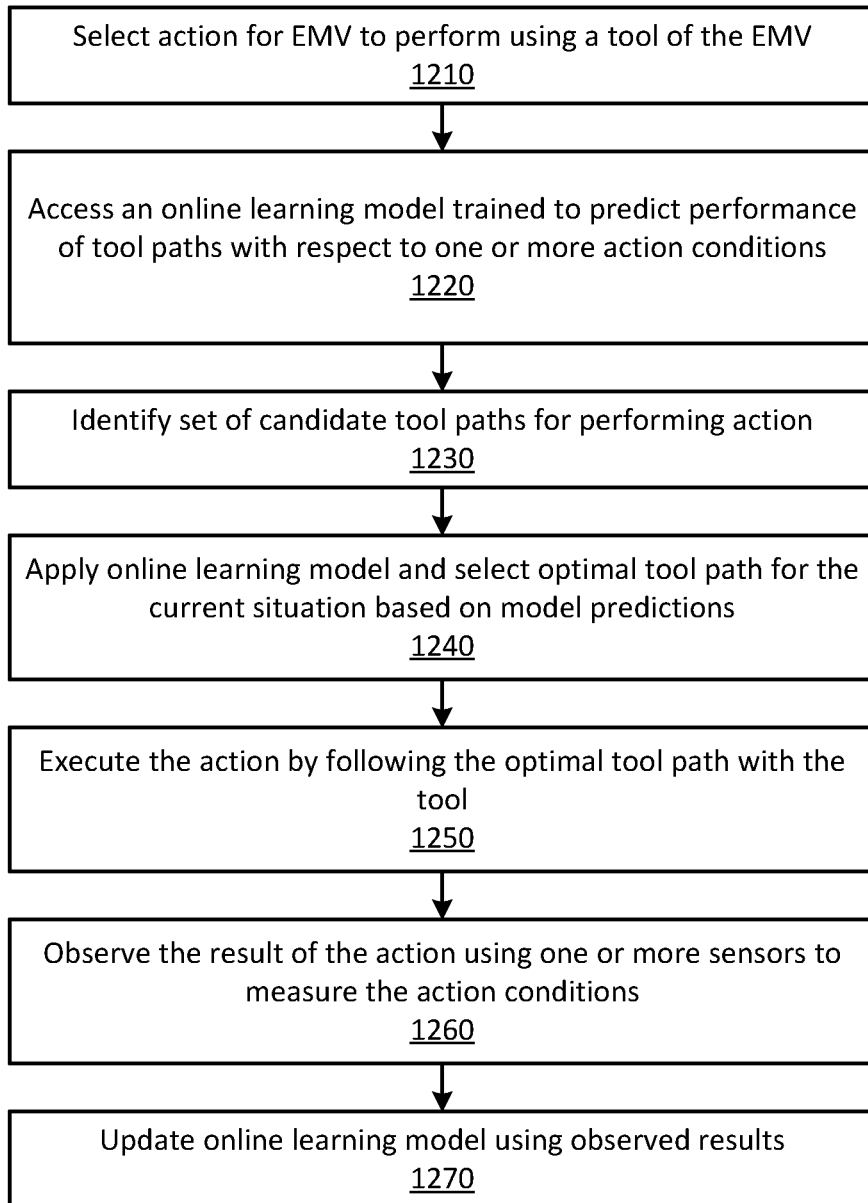
FIG. 12 is a flowchart describing a process for selecting a tool path for an earth moving vehicle using a machine learning tool path model, according to one embodiment.

FIG. 12 is a flowchart describing a process for selecting a tool path for an earth moving vehicle using a machine learning tool path model, according to one embodiment. The process 1200 begins when an autonomous control system selects 1210 an earth moving action for an EMV to perform using a tool. Then, the autonomous control system accesses 1220 an online learning model trained to predict the performance of a tool path with respect to a set of action conditions. As described above, the action condition is a metric used to evaluate the success of the target action (such as the predicted speed or fuel efficiency of the action). Based, for example, on the type of target action and the current state of the EMV, the autonomous control system identifies 1230 a set of candidate tool paths for performing the target action. The autonomous control system then selects an optimal tool path for the current situation by applying 1240 the retrieved online learning model to the candidate tool paths. For example, the autonomous control system can evaluate each candidate tool path using the tool path model and select the highest ranked candidate tool path with respect to the set of action conditions. The autonomous control system can then instruct the EMV to execute the target action using the selected optimal tool path. The actual result of the execution of the target action is then observed 1260 by measuring the set of action conditions based on collected sensor data. For example, the speed of the earth moving action can be calculated by measuring the amount of time the EMV takes to reach an end state of the earth moving action. In some implementations, the online learning model is updated 1270 based on the observed results of the earth moving action, as described above.

Figure 13:
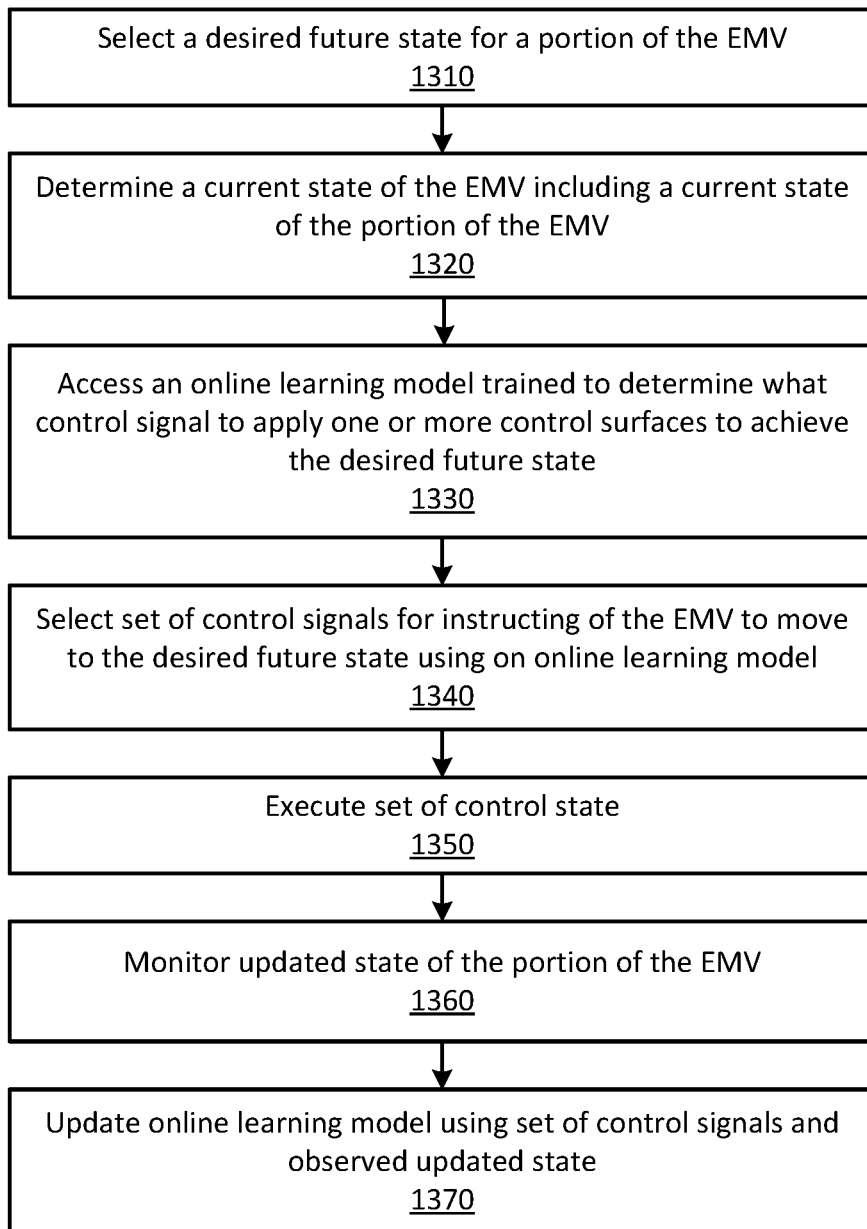
FIG. 13 is a flowchart describing a process for controlling an earth moving vehicle using a machine learning control model, according to one embodiment.

FIG. 13 is a flowchart describing a process for controlling an earth moving vehicle using a machine learning control model, according to one embodiment. The process 1300 begins when an autonomous control system selects 1310 a desired future state for a portion of the EMV including one or more control surfaces. For example, a tool path for an earth moving action can include one or more target states for control surfaces of the EMV, as described above. Additionally, the autonomous control system then determines 1320 a current state of the EMV including the current state of the portion of the EMV, for example by measuring the current positions of each control surface of the EMV. Then, the autonomous control system accesses 1330 an online learning model trained to determine what control signal to apply one or more control surfaces to achieve the desired future state. For example, the autonomous control system can use the control model to determine how much force to apply to achieve a target speed of the EMV or how long to apply an input to achieve a desired position of the EMV's arm. Then, the autonomous control system uses the control model to select 1340 a set of control signals and/or the associated timings to instruct the EMV to move to the desired future state. The autonomous control system the executes 1350 the selected control signals by sending them to a control input 140 of the EMV for execution. As the EMV executes the selected control signals, the autonomous control system monitors 1360 one or more updated states of the portion of the EMV. In some implementations, the autonomous control system updates 1370 the control model based on the observed updated state and the selected control signals, as described above.

Figure 14:
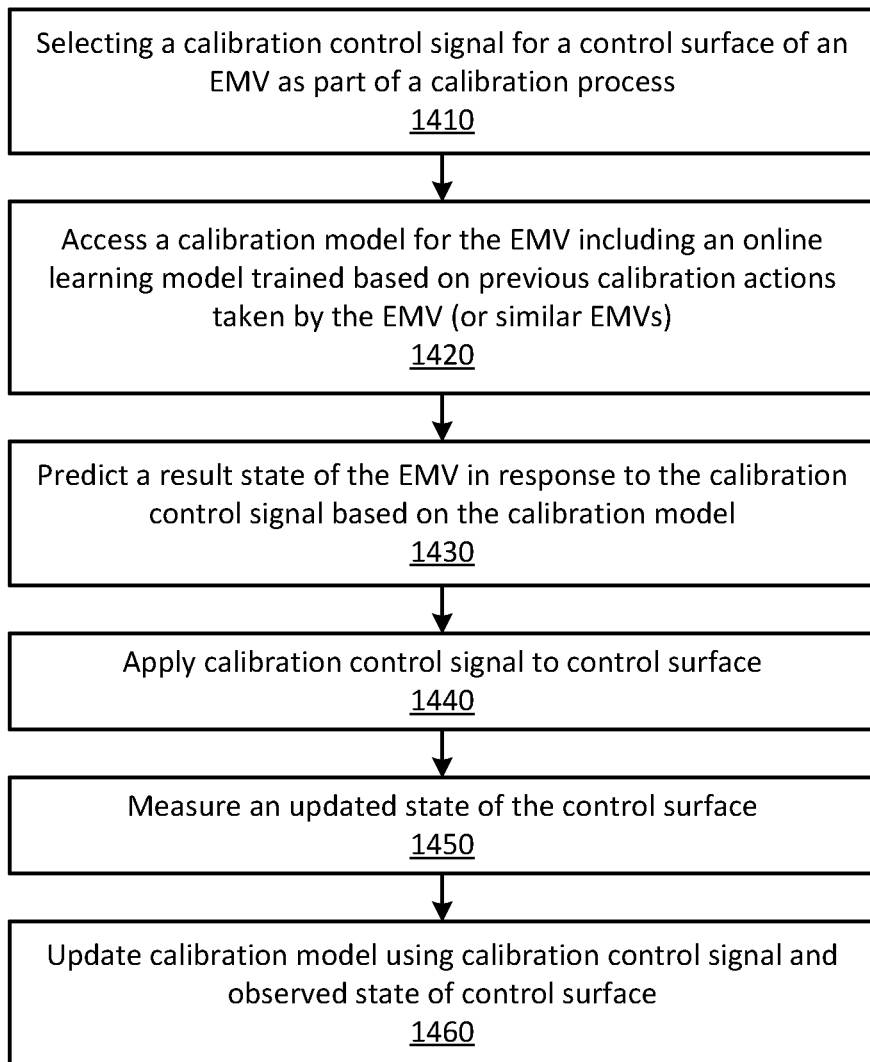
FIG. 14 is a flowchart describing a process for calibrating an earth moving vehicle using a machine learning calibration model, according to one embodiment.

FIG. 14 is a flowchart describing a process for calibrating an earth moving vehicle using a machine learning calibration model, according to one embodiment. The process 1400 begins when an autonomous control system selects 1410 a calibration control signal for a control surface of an EMV as part of a calibration process. As described above, the EMV can run through a calibration process periodically or based on certain trigger conditions being met.

Then, the autonomous control system accesses 1420 a calibration model for the EMV including an online learning model trained based on previous calibration actions taken by the EMV (or similar EMVs). As described above, the autonomous control system can predict 1430 a result state of the EMV in response to the calibration control signal using the calibration model. The autonomous control system the executes 1350 the calibration control signal by sending it to a control input 140 of the EMV for execution and measures 1450 the state of the control surface as the control signal is executed. In some implementations, the autonomous control system updates 1460 the control model based on the observed updated state and the calibration control signal, as described above.

General Computer Structure

As described herein, the autonomous control system 120 and off-unit control system 180 may include one or more generic or special purpose computers. A simplified example of the components of an example computer according to one embodiment is illustrated in FIG. 15.

Figure 15:
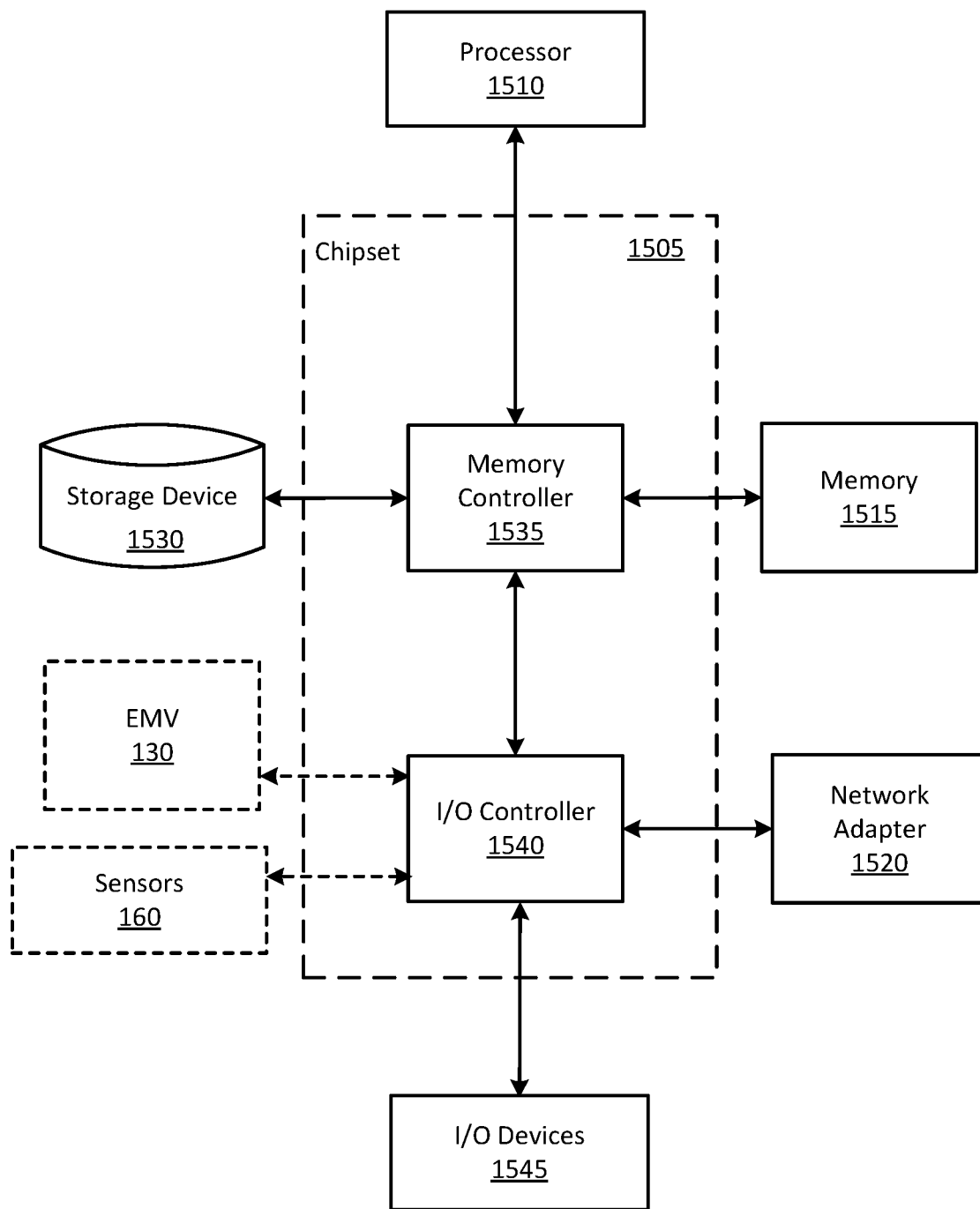
FIG. 15 is a high-level block diagram illustrating an example of a computing device, according to one embodiment.

FIG. 15 is a high-level block diagram illustrating physical components of an example off-unit control system 180, according to one embodiment. Illustrated is a chipset 1505 coupled to at least one processor 1510. Coupled to the chipset 1505 is volatile memory 1515, a network adapter 1520, an input/output (I/O) device(s) 1525, and a storage device 1530 representing a non-volatile memory. In one implementation, the functionality of the chipset 1505 is provided by a memory controller 1535 and an I/O controller 1540. In another embodiment, the memory 1515 is coupled directly to the processor 1510 instead of the chipset 1505. In some embodiments, memory 1515 includes high-speed random access memory (RAM), such as DRAM, SRAM, DDR RAM or other random access solid state memory devices.

The storage device 1530 is any non-transitory computer-readable storage medium, such as a hard drive, compact disk read-only memory (CD-ROM), DVD, or a solid-state memory device. The memory 1515 holds instructions and data used by the processor 1510. The I/O controller 1540 is coupled to receive input from the EMV 130 and sensors 160, as described in FIG. 1, and displays data using the I/O devices 1545. The I/O device 1545 may be a touch input surface (capacitive or otherwise), a mouse, track ball, or other type of pointing device, a keyboard, or another form of input device. The network adapter 1520 couples the off-unit control system 180 to the network 170.

As is known in the art, a computer can have different and/or other components than those shown in FIG. 2. In addition, the computer can lack certain illustrated components. In one embodiment, a computer acting as server may lack a dedicated I/O device 345. Moreover, the storage device 1530 can be local and/or remote from the computer (such as embodied within a storage area network (SAN)), and, in one embodiment, the storage device 1530 is not a CD-ROM device or a DVD device. Generally, the exact physical components used in the autonomous control system 120 and off-unit control system 180 will vary. For example, the autonomous control system 120 may be communicatively coupled to the controller 150 and sensor assembly 110 differently than the off-unit control system 180.

Typically, the off-unit control system 180 will be a server class system that uses powerful processors, large memory, and faster network components compared to the autonomous control system 120, however this is not necessarily the case. Such a server computer typically has large secondary storage, for example, using a RAID (redundant array of independent disks) array and/or by establishing a relationship with an independent content delivery network (CDN) contracted to store, exchange and transmit data such as the asthma notifications contemplated above. Additionally, the computing system includes an operating system, for example, a UNIX operating system, LINUX operating system, or a WINDOWS operating system. The operating system manages the hardware and software resources of the off-unit control system 180 and also provides various services, for example, process management, input/output of data, management of peripheral devices, and so on. The operating system provides various functions for managing files stored on a device, for example, creating a new file, moving or copying files, transferring files to a remote system, and so on.

As is known in the art, the computer is adapted to execute computer program modules for providing functionality described herein. A module can be implemented in hardware, firmware, and/or software. In one embodiment, program modules are stored on the storage device 1530, loaded into the memory 1515, and executed by the processor 1510.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    selecting, by an earth moving vehicle (EMV), an earth moving action to autonomously perform using a tool of the EMV;
    identifying a set of candidate tool paths through which to move the tool of the EMV based on the selected earth moving action;
    for each candidate tool path of the set of candidate tool paths, inputting the candidate tool path to a machine-learning model trained to determine a metric for the candidate tool path with respect to one or more action conditions associated with the earth moving action, wherein the determined metric describes whether the candidate tool path satisfies each of the one or more action conditions;
    selecting, by the EMV, a tool path from the set of candidate tool paths which best satisfies the one or more action conditions based on the metrics determined by the machine-learning model;
    executing, by the EMV, the earth moving action using the selected tool path; and
    retraining the machine learning model based on a result of the executed earth moving action after the EMV completes the earth moving action.

2. The method of claim 1, wherein the earth moving action comprises a manipulation of material using the tool of the EMV.

3. The method of claim 1, wherein the earth moving action comprises excavating material using the tool of the EMV.

4. The method of claim 1, wherein the tool is an excavator bucket.

5. The method of claim 1, wherein:
    the set of candidate tool paths comprises a plurality of tool paths with different attack angles; and
    wherein an attack angle is an angle of the tool relative to material the tool is interacting with as part of the earth moving action.

6. The method of claim 1, wherein retraining the machine-learning model comprises measuring the result of the executed earth moving action with respect to the one or more action conditions using one or more sensors.

7. The method of claim 1, wherein retraining the machine learning model comprises using online learning techniques to retrain the machine learning model based on measurements of the one or more action conditions.

8. A non-transitory computer-readable storage medium storing executable instructions that, when executed by a hardware processor, cause the hardware processor to perform steps comprising:
    selecting, by an earth moving vehicle (EMV), an earth moving action to autonomously perform using a tool of the EMV;
    identifying a set of candidate tool paths through which to move the tool of the EMV based on the selected earth moving action;
    for each candidate tool path of the set of candidate tool paths, inputting the candidate tool path to a machine-learning model trained to determine a metric for the candidate tool path with respect to the one or more action conditions associated with the earth moving action, wherein the determined metric describes whether the candidate tool path satisfies each of the one or more action conditions selecting, by the EMV, a tool path from the set of candidate tool paths which best satisfies the one or more action conditions based on the metrics determined by the machine-learning model;

executing, by the EMV, the earth moving action using the selected tool path; and retraining the machine learning model based on a result of the executed earth moving action after the EMV completes the earth moving action.

9. The non-transitory computer-readable storage medium of claim 8, wherein the earth moving action comprises manipulation of material using the tool of the EMV.

10. The non-transitory computer-readable storage medium of claim 8, wherein the earth moving action comprises excavating material using the tool of the EMV.

11. The non-transitory computer-readable storage medium of claim 8, wherein the tool is an excavator bucket.

12. The non-transitory computer-readable storage medium of claim 8, wherein:

the set of candidate tool paths comprises a plurality of tool paths with different attack angles; and wherein an attack angle is an angle of the tool relative to material the tool is interacting with as part of the earth moving action.

13. The non-transitory computer-readable storage medium of claim 8, wherein retraining the machine-learning model comprises measuring the result of the executed earth moving action with respect to the one or more action conditions using one or more sensors.

14. The non-transitory computer-readable storage medium of claim 8, wherein retraining the machine learning model comprises using online learning techniques to retrain the machine learning model based on the measurements of the one or more action conditions.

15. A method comprising:

selecting, by an earth moving vehicle (EMV), an earth moving action to autonomously perform using a tool of the EMV;

selecting, by the EMV, a tool path through which to move the tool of the EMV based on results of previous earth moving actions autonomously performed by the EMV; and moving, by the EMV, the tool of the EMV based on the selected tool path.

16. The method of claim 15, wherein the earth moving action comprises a manipulation of material using the tool of the EMV.

17. The method of claim 15, wherein the earth moving action comprises excavating material using the tool of the EMV.

18. The method of claim 15, wherein the tool is an excavator bucket.

19. The method of claim 15, wherein the previous earth moving actions comprise a first previous action and a second previous action, and wherein selecting the tool path comprises selecting a tool path corresponding to the first previous action or the second previous action.

20. The method of claim 15, wherein selecting the tool path comprises selecting an average of tool paths corresponding to two or more of the previous earth moving actions.

* * * * *